US007390901B2

(12) United States Patent
Yang et al.

(10) Patent No.: US 7,390,901 B2
(45) Date of Patent: Jun. 24, 2008

(54) FLUORINATED DYES OR COLORANTS AND THEIR USES

(75) Inventors: Jin Yang, San Jose, CA (US); Kai-Chia Feng, San Mateo, CA (US); Ying-Syi Li, San Jose, CA (US); HongMei Zang, Sunnyvale, CA (US); Hong Wang, San Jose, CA (US); Chien-Hung Chou, Livermore, CA (US); Rong-Chang Liang, Cupertino, CA (US)

(73) Assignee: SiPix Imaging, Inc., Fremont, CA (US)

( * ) Notice: Subject to any disclaimer, the term of this patent is extended or adjusted under 35 U.S.C. 154(b) by 550 days.

(21) Appl. No.: 10/903,923

(22) Filed: Jul. 29, 2004

(65) Prior Publication Data
US 2005/0039274 A1 Feb. 24, 2005

Related U.S. Application Data

(60) Provisional application No. 60/493,703, filed on Aug. 8, 2003, provisional application No. 60/501,921, filed on Sep. 10, 2003.

(51) Int. Cl.
C07D 221/22 (2006.01)
(52) U.S. Cl. .......................................... 546/33
(58) Field of Classification Search ............... 546/3; 540/145
See application file for complete search history.

(56) References Cited

U.S. PATENT DOCUMENTS

| | | | |
|---|---|---|---|
| 3,006,921 | A | 10/1961 | Weinmayr |
| 3,281,426 | A | 10/1966 | van Dyke Tiers |
| 5,260,435 | A | 11/1993 | Sawada et al. |
| 5,283,148 | A | 2/1994 | Rao |
| 5,378,589 | A | 1/1995 | Sawada et al. |
| 5,530,067 | A | 6/1996 | Rao et al. |
| 5,930,026 | A | 7/1999 | Jacobson et al. |
| 5,932,721 | A | 8/1999 | Yashiro et al. |
| 5,961,804 | A | 10/1999 | Jacobson et al. |
| 6,043,355 | A | 3/2000 | Yashiro et al. |
| 7,026,643 | B2 * | 4/2006 | Dimitrakopoulos et al. ... 257/40 |

FOREIGN PATENT DOCUMENTS

WO WO 98/45756 10/1998

OTHER PUBLICATIONS

Thelakkat et al., Macromolecules 2001, 34, 7441-7447.*
Meng et al., Polym. Adv. Technol. 12, 206-214 (2001).*
U.S. Appl. No. 09/518,488, filed Mar. 2000, Liang et al.
U.S. Appl. No. 09/606,654, filed Jun. 2000, Liang et al.
U.S. Appl. No. 09/784,972, filed Feb. 2001, Chang-Park et al.
U.S. Appl. No. 10/394,488, filed Mar. 2003, Ho et al.
U.S. Appl. No. 10/421,217, filed Apr. 2003, Chung et al.
U.S. Appl. No. 10/439,428, filed May 2003, Li et al.
U.S. Appl. No. 10/766,757, filed Jan. 2004, Liang et al.
U.S. Appl. No. 60/367,325, filed Mar. 2002, Ho et al.
U.S. Appl. No. 60/375,299, filed Apr. 2002, Chung et al.
U.S. Appl. No. 60/381,263, filed May 2002, Li et al.
U.S. Appl. No. 60/443,893, filed Jan. 2003, Li et al.
Allen, K. Emerging Displays Come Roaring Back. *Emerging Displays Review: Emerging Display Technologies, Monthly Report*—May 2004, 21-23.
Allen, K. Passive Displays Staging a Comback. *Emerging Displays Review: Emerging Display Technologies, Monthly Report*—May 2004, 19-20.
Allen, K. Sign Me Up! *Emerging Displays Review: Emerging Display Technologies, Monthly Report*—May 2004, 12-13.
Allen, K. Electrophoretics Fulfilled. *Emerging Displays Review: Emerging Display Technologies, Monthly Report*—Oct. 2003, 9-14.
Callot, H.J., (1974) Bromation de la m-teraphenylporphine. Preparation d'alkyl- et de polycyanoporphines . *Bull. Soc. Chim. Fr.*, No. 7-8, 1492-1496.
Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, 19.6.1.
Chen, S.M. (Jul. 2003) The Applications for the Revolutionary Electronic Paper Technology. *OPTO News & Letters*, 102, 37-41. (in Chinese, English abstract attached, full translation available upon request).
Chen, S.M. (May 2003) The New Applications and the Dynamics of Companies. *TRI.* 1-10. (In Chinese, English abstract attached, full translation available upon request).
Chin, S. (May 2004) *Electronic Paper Supplier to Work With Philips Venture* (online). EETimes [retrieved on Jun. 11, 2004]. Retrieved from the Internet : URL : http://www.eetimes.com/sys/news/showArticle.jhtml?articleID=21100323.
Chung, J., Hou, J., Wang, W., Chu, L.Y., Yao, W., & Liang, R.C. (Dec. 2003). Microcup(R) Electrophoretic Displays, Grayscale and Color Rendition. *IDW*, AMD2/EP1-2, 243-246.
*Collaboration to Roll Out Electronic Paper* (online). Laser Focus World Magazine, 2004 [retrieved on Jun. 11, 2004]. Retrieved from the Internet : URL : http://ifw.pennnet.com/Articles/Article_Display.cfm?Section=OnlineArticles&SubSection=Display&PUBLICATION_ID=12&ARTICLE_ID=205374.
Grehn, L. And Ragnarsson, U. (1984) A Convenient Method for the Preparation of 1-(tert-Butyloxycarbonyl)pyrroles. *Agnew. Chem. Int. Ed. Engl.*, , 23(4), 296 & 301.
Ho, C.,& Liang, R.C. (Dec. 2003). *Microcup (R) Electronic Paper by Roll-to-Roll Manufacturing Processes*. Presentation conducted at FEG, Nei-Li, Taiwan.
Hopper, M.A. and Novotny, V., 1979, IEEE Trans.Electr.Dev., vol. ED-26, No. 8, pp. 1148-1152.
Hou, J., Chen,Y., Li,Y., Weng, X., Li, H. And Pereira, C. (May 2004). Reliability and Performance of Flexible Electrophoretic Displays by Roll-to-Roll Manufacturing Processes. *SID Digest*, 32.3, 1066-1069.
Lee, H., & Liang, R.C. (Jun. 2003) SiPix Microcup(R) Electronic Paper—An Introduction. *Advanced Display*, 3, 4-9 (in Chinese, English abstract attached, full translation available upon request).

(Continued)

*Primary Examiner*—James O. Wilson
*Assistant Examiner*—Paul V. Ward
(74) *Attorney, Agent, or Firm*—Howrey LLP

(57) ABSTRACT

This invention relates to novel fluorinated dyes or colorants having high solubility and low viscosity in halogenated, especially fluorinated, solvents. The dyes or colorants of the present invention have shown to improve the performance of electrophoretic displays.

22 Claims, No Drawings

OTHER PUBLICATIONS

Liang, R.C., Zang, H.M., Wang, X., Chung, J. & Lee, H., (Jun./Jul. 2004) <<Format Flexible Microcup (R) Electronic Paper by Roll-to-Roll Manufacturing Process >>, Presentation conducted at the 14th FPD Manufacturing Technology Expo & Conference.

Liang, R.C. (Apr. 2004). *Microcup Electronic Paper by Roll-to-Roll Manufacturing Process*. Presentation at the Flexible Displays & Electronics 2004 of Intertech, San Fransisco, California, USA.

Liang, R.C., Hou, J., Chung, J., Wang, X., Pereira, C., & Chen, Y. (2003). Microcup(R) Active and Passive Matrix Electrophoretic Displays by A Roll-to-Roll Manufacturing Processes. *SID Digest*, 20.1.

Liang, R.C., Hou, J., Zang, H.M., Chung, J., & Tseng, S. (2003). Microcup(R) displays : Electronic Paper by Roll-to-Roll Manufacturing Processes. *Journal of the SID*, 11(4), 621-628.

Liang, R.C., Hou, J., Zang, H.M., & Chung, J. (Feb. 2003). *Passive Matrix Microcup(R) Electrophoretic Displays*. Paper presented at the IDMC, Taipei, Taiwan.

Liang, R.C., & Tseng, S. (Feb. 2003). *Microcup(R) LCD, An New Type of Dispersed LCD by A Roll-to-Roll Manufacturing Process*. Paper presented at the IDMC, Taipei, Taiwan.

Liang, R.C. (Feb. 2003) *Microcup(R) Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.

Liang, R.C., Hou, J., & Zang, H.M. (Dec. 2002) Microcup Electrophoretic Displays by Roll-to-Roll Manufacturing Processes. *IDW*, EP2-2, 1337-1340.

Miyaura, et al (1989) Palladium-Catalyzed Inter- and Intramolecular Cross-Coupling Reactions of B-Alkyl-9-borabicyclo[3.3.1]nonane Derivatives with 1-Halo-1-alkenes or Haloarenes. Syntheses of Functionalized Alkenes, Arenes, and Cycloalkenes via a Hydroboration-Coupling Sequence. *J. Am. Chem. Soc.*, 111, 314-321.

Mossman, M.A., (2001) New Reflective Color Display Technique Based on Total Internal Reflection and Subtractive Color Filtering. *SID Digest*, 1054-1057.

Mossman, M.A. & Whitehead, L.A. (2002) Grey Scale Control of TIR Using Electrophoresis of Sub-Optical Pigment Particles. *SID Digest*, 522-525.

Nikkei Microdevices. (Dec. 2002) Newly-Developed Color Electronic Paper Promises—Unbeatable Production Efficiency. *Nikkei Microdevices*, 3. (in Japanese, with English translation).

Mossman, M.A., Arney, D., Biernath, R., Coope, R., Kotlicki, A., Pellerite, M. & etc. (2000) New Reflective Display Based on Total Internal Reflection in Prismatic Microstructures. *SID IDRC Proceedings*, 311-314.

*SiPix, Polymer to Create Rollable, Flexible Display* (online). Eetasia.com, 2004 [retrieved on Jul. 2, 2004]. Retrieved from the Internet : URL not available.

Paultre, A.L. (May 2004) *Imaging Industry Displays Visions of the Future : Display Innovations and New Technologies are Raising Industry Eyebrows* (online). Electronic Products [retrieved on Jun. 11, 2004]. Retrieved from inthe Internet : URL : http://www.electronicproducts.com/ShowPage.asp?SECTION=3700&PRIMID=&FileName=augOL1.aug2003.

*SiPix Enters Joint Development wit hPhilips* (online). Azcom.com, 2004 [retrieved on Jun. 11, 2004]. Retrieved from the Internet : URL : www.azom.com/news.asp?newsID=1449.

*SiPix Announces First Retail Customer ; Electronic Papter Finds its First <<Killer Application >>* (online). TMCNet.com, 2004 [retrieved on Jun. 11, 2004]. Retrieved from the Internet : URL : www.tmcnet.com/usubmit/2004/May/1043846.htm.

*SiPix Enters Joing Development Agreement ; Partnership to Build the Most Rollable, Flexible Display in the World* (online). TMCNet.com, 2004 [retrieved on Jun. 11, 2004]. Retrieved from the Internet : URL : www.tmcnet.com/usubmit/2004/May/1043845.htm.

Society of Information Display. (2004). *Information Display, SID 2004 Reivew Issue*, 20(3&4), 37-38.

Wang, X., Kiluk, S., Chang, C., Wu, Y., & Liang, R.C. (Feb. 2004). *Mirocup (R) Electronic Paper and the Converting Processes*. Paper presented at the ASID, Nanjing, China.

Zang, H.M. (Feb. 2004). *Microcup Electronic Paper*. Presentation conducted at the Displays & Microelectronics Conference of U.S. Display Consortium, Phoenix, Arizona, USA.

Zang, H.M, Hwang, J.J., Gu, H., Hou, J., Weng, X., Chen, Y., et al. (Jan. 2004). Threshold and Grayscale Stability of Microcup (R) Electronic Paper. *Proceeding of SPIE-IS&T Electronic Imaging*, SPIE vol. 5289, 102-108.

Zang, H.M. (Oct. 2003). *Microcup (R) Electronic Paper by Roll-to-Roll Manufacturing Processes*. Presentation conducted at the Advisory Board Meeting, Bowling Green State University, Ohio, USA.

Zang, H.M., & Liang, R.C. (2003) Microcup Electronic Paper by Roll-to-Roll Manufacturing Processes. *The Spectrum*, 16(2), 16-21.

\* cited by examiner

FLUORINATED DYES OR COLORANTS AND THEIR USES

RELATED APPLICATIONS

This application claims the priorities under 35 USC 119(e) of U.S. Provisional Application No. 60/493,703 filed on Aug. 8, 2003 and U.S. Provisional Application No. 60/501,921 filed on Sep. 10, 2003. The whole contents of both priority applications are incorporated herein by reference in their entirety.

BACKGROUND

1. Field of the Invention

This invention relates to novel fluorinated dyes or colorants having high solubility and low viscosity in halogenated, especially fluorinated, solvents. The dyes or colorants of the present invention have shown to improve the performance of electrophoretic displays.

2. Brief Description of Related Art

The electrophoretic display (EPD) is a non-emissive device based on the electrophoresis phenomenon influencing the migration of charged pigment particles in a solvent, preferably a colored dielectric solvent. This type of display was first proposed in 1969. An EPD typically comprises a pair of opposed, spaced-apart plate-like electrodes, with spacers predetermining a certain distance between them. At least one of the electrodes, typically on the viewing side, is transparent. For the passive type of EPDs, row and column electrodes on the top (the viewing side) and bottom plates, respectively, are needed to drive the displays. In contrast, an array of thin film transistors (TFTs) on the bottom plate and a common, non-patterned transparent conductor plate on the top viewing substrate may be used for the active type EPDs.

An electrophoretic dispersion composed of a dielectric solvent and charged pigment particles dispersed therein is enclosed between the two plates. When a voltage difference is imposed between the two electrodes, the pigment particles migrate by attraction to the plate of polarity opposite that of the pigment particles. Thus, the color showing at the transparent plate, determined by selectively charging the plates, may be either the color of the solvent or the color of the pigment particles. Reversal of plate polarity will cause the particles to migrate back to the opposite plate, thereby reversing the color. Intermediate color density (or shades of gray) due to intermediate pigment density at the transparent plate may be obtained by controlling the plate charge through a range of voltages or pulsing time.

EPDs of different pixel or cell structures have been reported previously, for example, the partition-type EPD [M. A. Hopper and V. Novotny, IEEE Trans. Electr. Dev., Vol. ED 26, No. 8, pp. 1148-1152 (1979)], the microencapsulated EPD (U.S. Pat. Nos. 5,961,804 and 5,930,026 and U.S. applications, Ser. No. 60/443,893, filed Jan. 30, 2003 and Ser. No. 10/766,757, filed on Jan. 27, 2004) and the total internal reflection (TIR) type of EPD using microprisms or microgrooves as disclosed in M. A. Mossman, et al, SID 01 Digest pp. 1054 (2001); SID IDRC proceedings, pp. 311 (2001); and SID'02 Digest, pp. 522 (2002).

An improved EPD technology was recently disclosed in co-pending applications, U.S. Ser. No. 09/518,488, filed on Mar. 3, 2000 (WO01/67170), U.S. Ser. No. 09/606,654, filed on Jun. 28, 2000 (WO02/01281) and U.S. Ser. No. 09/784,972, filed on Feb. 15, 2001 (WO02/02/65215). The improved EPD comprises isolated cells formed from microcups and filled with charged particles dispersed in a dielectric solvent. To confine and isolate the electrophoretic dispersion in the cells, the filled cells are top-sealed with a polymeric sealing layer, preferably formed from a composition comprising a material selected from a group consisting of thermoplastics, thermoplastic elastomers, thermosets and precursors thereof.

Other types of displays, namely magnetophoretic displays (MPDs) and electromagnetophoretic displays (EMPDs), are disclosed in co-pending applications, U.S. Ser. No. 60/367,325, filed on Mar. 21, 2002, U.S. Ser. No. 10/394,488, filed on Mar. 20, 2003, U.S. Ser. No. 60/375,299, filed on Apr. 23, 2002 and U.S. Ser. No. 10/421,217, filed on Apr. 22, 2003. The magnetophoretic display generally comprises display cells sandwiched between two layers of substrate and filled with a magnetophoretic dispersion wherein the pigment particles are magnetic but not charged. The display is driven by a magnetic field. At least the substrate layer on the viewing side is transparent. In the electromagnetophoretic display, the display cells sandwiched between two substrate layers are filled with an electromagnetophoretic dispersion wherein the pigment particles are both charged and magnetic. One of the substrate layers, preferably on the non-viewing side, is coated with a conductive layer facing the filled display cells. The display is driven by a combination of electric and magnetic fields. The substrate layer on the viewing side is transparent.

For all types of displays, the dispersion contained within the display cells is undoubtedly one of the most crucial parts of the device. The dispersion, as stated earlier, usually is composed of pigment particles dispersed in a colored dielectric solvent or solvent mixture. The composition of the dispersion determines, to a large extent, the longevity, contrast ratio, switching rate, response waveform, threshold characteristics and bistability of the device. In an ideal dispersion, the dispersed pigment particles remain separate and do not aggregate or flocculate under all operating conditions. Furthermore, all components in the dispersion must be chemically and electrochemically stable and compatible not only with each other but also with the other materials present in the display, such as the electrodes and sealing and substrate materials.

The dispersing medium may be colored by dissolving or dispersing a dye or colorant in the dielectric solvent or solvent mixture.

Halogenated solvents of a high specific gravity have been widely used in EPD applications particularly in those involving an inorganic pigment, such as $TiO_2$, as the charged whitening or coloring particles. The halogenated solvents of a high specific gravity are very useful in reducing the rate of sedimentation of the pigment particles in the solvent. Fluorinated solvents are among the most preferred because they are chemically stable and environmentally friendly.

However, most dyes or pigments are not soluble in fluorinated solvents particularly perfluorinated solvents having a high boiling-point. For example, phthalocyanines are highly desirable colorants due to their high extinction coefficients and chemical stability; but they are normally insoluble in most solvents, particularly insoluble in fluorinated solvents. Substitution on the ring with an organic group such as an alkyl or fluorinated alkyl may improve the solubility in organic solvents, particularly fluorinated solvents. However, the solubility is not sufficiently high and is also strongly temperature dependent. As a result, the EPDs colored by this type of dyes typically show poor shelf-life stability and narrow operation temperature latitude.

Certain soluble perfluorinated Cu phthalocyanine dyes have been disclosed in U.S. Pat. No. 3,281,426 (1966). The process for the preparation of these dyes involves heating a mixture of an aromatic starting compound and a perfluoroalkyliodide at a temperature in the range of from 200° C. to 350° C. The reaction is performed in an autoclave or a pressure ampoule due to the pressure developed. This synthesis involves complicated reaction conditions (e.g., high pressure and temperature) and long reaction time and has a low yield.

Other phthalocyanine derivatives (U.S. Pat. Nos. 6,043,355 and 5,932,721) show improved solubility in various organic solvents or even in water, but not in highly fluorinated solvents.

A group of fluorinated silicon (IV) phthalocyanine and naphthalocyanine dyes are disclosed in U.S. applications, Ser. No. 60/381,263, filed on May 17, 2002 and Ser. No. 10/439,428, filed May 15, 2003. However the solubility of the fluorinated Si phthalocyanine and naphthalocyanine dyes in perfluorinated solvents, such as HT-200, is still limited and the viscosity of the resultant electrophoretic dispersion containing this type of dyes is relatively high.

The whole content of each document referred to in this application is incorporated by reference into this application in its entirety.

SUMMARY OF THE INVENTION

The present invention is directed to novel fluorinated dyes or colorants. The dyes or colorants comprise at least about 25% by weight, preferably at least about 35% by weight and more preferably at least about 50% by weight, of fluorine, provided that in the case of a metal phthalocyanine or naphthalocyanine dye or a vat dye, the source of fluorine cannot be perfluoroalkyl(s) only.

The first aspect of the invention is directed to a group of fluorinated phthalocyanine and naphthalocyanine dyes or colorants.

The second aspect of the invention is directed to a group of fluorinated anthraquinone dyes or colorants.

The third aspect of the invention is directed to a group of fluorinated perylene dyes or colorants.

The fourth aspect of the invention is directed to a group of fluorinated quinacridone dyes or colorants.

The fifth aspect of the invention is directed to a group of fluorinated diketopyrrolopyrrole (DPP) dyes or colorants.

The sixth aspect of the invention is directed to a group of fluorinated porphyrin dyes or colorants.

The seven aspect of the invention is directed to a group of fluorinated naphthalimide dyes or colorants.

The dyes and colorants of the present invention are highly soluble in fluorinated solvents. Their solubility in the fluorinated solvents may exceed about 0.1 gm/mL, preferably about 0.2 gm/mL and more preferably about 0.25 gm/mL. The fluorinated solvents may comprise at least about 50%, preferably at least about 55% and more preferably at least about 60%, by weight of fluorine. Examples of such fluorinated solvents may include, but are not limited to, perfluorinated solvents such as perfluoroalkanes or perfluorocycloalkanes (e.g., perfluorodecalin), perfluoroarylalkanes (e.g., perfluorotoluene or perfluoroxylene), perfluoro-tert-amines, perfluoropolyethers such as those from Solvay Solexis and perfluoropolyethers (HT series) and hydrofluoropolyethers (ZT series) from Solvay Solexis, FC-43 (heptacosafluorotributylamine), FC-70 (perfluorotri-n-pentylamine), PF-5060 or PF-5060DL (pefluorohexane) from 3M Company (St. Paul, Minn.), low molecular weight (preferably less than 50,000, more preferably less than 20,000) polymers or oligomers such as poly(perfluoropropylene oxide) from TCI America (Portland, Oreg.), poly(chlorotrifluoroethylene) such as Halocarbon Oils from Halocarbon Product Corp. (River Edge, N.J.) and Demnum lubricating oils from Daikin Industries. Perfluoropolyethers and hydrofluoropolyethers such as HT-170, HT-200, HT-230, ZT-180 (Solvay Solexis) and trifluoro(trifluoromethyl)-oxirane homopolymers such as K6 and K-7 fluids (Dupont) are particularly useful.

These dyes or colorants not only exhibit high solubility or dispersibility in halogenated, particularly perfluorinated, dielectric solvents, but also show improved temperature latitude and switching performance especially at low temperatures.

DETAILED DESCRIPTION OF THE INVENTION

Definitions:

The term "alkyl" refers to a linear, branched or cyclic hydrocarbon chain. Unless otherwise indicated, the "alkyl" group, in the context of the present application, has 1 to 20, preferably 1 to 12, carbon atoms. Examples of "alkyl" may include methyl, ethyl, cyclohexyl, octyl, n-decyl and the like which is optionally unsaturated, such as ethenyl, 3-hexenyl or the like.

The term "heteroalkyl" refers to an alkyl group in which one or more carbon atoms are replaced by heteroatom(s) such as O, S or NR* (wherein R* is hydrogen or an alkyl of 1-12 carbon atoms).

The term "aryl" refers to an organic radical derived from an aromatic ring having 6 to 18 carbon atoms including, but not limited to, phenyl, biphenyl, naphthyl, anthracenyl and the like.

The term "heteroaryl" refers to an aryl group in which one or more carbon atoms of the aromatic ring are replaced by heteroatom(s) such as O, S or NR* (wherein R* is hydrogen or an alkyl of 1-12 carbon atoms). Examples of "heteroaryl" may include, but are not limited to, thienyl, furyl, pyrrolyl, pyridinyl or the like.

In the context of the present application, the term "alkyl", "heteroalkyl", "aryl" or "heteroaryl" may include alkyl, heteroalkyl, aryl or heteroaryl optionally substituted with a metal, such as B, Si, Se, Cu, Ca, Zn, Mg, Ti, Co or Zr.

Unless indicated otherwise, the term "alkyl", "heteroalkyl", "aryl" or "heteroaryl" may also include alkyl, heteroalkyl, aryl or heteroaryl optionally substituted with one or more of the following: halogen, alkyl, aryl, —$NO_2$, NC—, HO(O)C—, RO—, RHN—, R$_2$N—, RS—, RCO—, RC(O)O—, RO(O)C—, RNHC(O)—, R$_2$NC(O)—, RNHC(O)O—, ROC(O)NH—, RC(O)NH—, RC(S)NH—, RNHC(O)NH—, RNHC(S)NH—, RSC(O)NH—, R=N—, RNHC(O)S— and the like (wherein R** is hydrogen, alkyl or aryl).

Each "alkyl", "heteroalkyl", "aryl" or "heteroaryl" is preferably unsubstituted or substituted with an unsubstituted alkyl or aryl, more preferably each "alkyl", "heteroalkyl", "aryl" or "heteroaryl" is unsubstituted.

The terms "alkoxy" and "aryloxy" refer to the moieties of alkyl-O— and aryl-O—, respectively.

The term "alkylene" refers to a bivalent group derived from an alkyl moiety by removal of a hydrogen atom from each of two carbon atoms, preferably the two end carbon atoms.

The term "arylene" refers to a bivalent group derived from an aryl moiety by removal of a hydrogen atom from each of two ring carbon atoms.

The "alkylene" and "arylene" may be optionally substituted with one or more of fluorinated alkyl or aryl or the substituents listed above for the terms "alkyl" or "aryl". Preferably, the "alkylene" or "arylene" is unsubstituted or substituted with an unsubstituted alkyl or aryl or a fluorinated alkyl or aryl.

The term "halogenated" or "fluorinated" refers to a moiety in which some or all of the hydrogen atoms are replaced with halogen or fluorine atoms, respectively.

The term "divalent metal", in the context of the present invention, may be $Cu^{++}$, $Zn^{++}$, $Ni^{++}$, $Co^{++}$, $Mg^{++}$, $Zr^{++}$, $Ti^{++}$, $Si^{++}$ or $Sn^{++}$, preferably $Cu^{++}$ or $Zn^{++}$.

The term "oxometal group" is defined as $M(O)_y$ wherein M is a metal moiety and y is an integer, particularly 1 or 2.

Examples of "oxometal group" may include Ti=O++, Sn=O++ and the like, preferably Ti=O++.

The term "halogenometal group" is defined as M(X)$_y$, wherein X is a halogen, particularly chlorine and fluorine and y is an integer, particularly 1 or 2. Examples of "halogenometal group" may include AlCl++, GaCl++, SiCl$_2$++, GeCl$_2$++, SnCl$_2$++ and the like, preferably AlCl++ or SiCl$_2$++.

The term "hydroxymetal group" is defined as M(OH)$_y$, wherein y is an integer, particularly 1 or 2. Examples of "hydroxymetal group" may include AlOH++, GaOH++, Si(OH)$_2$++, Ge(OH)$_2$++, Sn(OH)$_2$++ and the like, preferably AlOH++.

The term "vat dye" refers to a commonly known dye material, such as indigo, that produces a fast color by impregnating fiber with a reduced soluble form that is then oxidized to an insoluble form.

I. Fluorinated Phthalocyanine and Naphthalocyanine Dyes and Colorants

The fluorinated phthalocyanine and naphthalocyanine dyes or colorants of the present invention may be represented by the following Formulas (I) and (II), respectively.

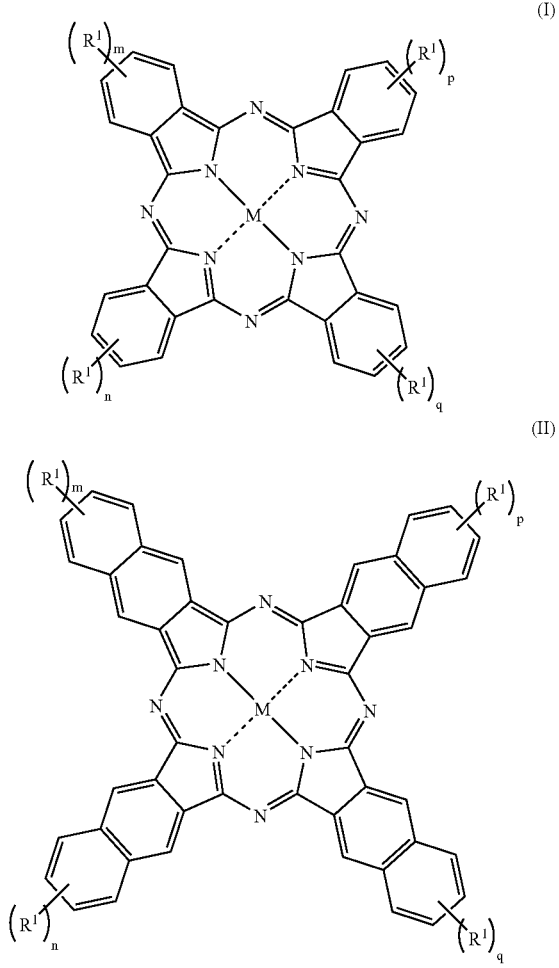

wherein:
m, n, p and q are independently 0-4 for the phthalocyanine dye or colorant of Formula (I) or 0-6 for the naphthalocyanine dye or colorant of Formula (II);
M is a divalent metal, an oxometal group, a halogenometal group or a hydroxymetal group;

$R^1$s are independently hydrogen, halogen, alkyl, heteroalkyl, aryl, heteroaryl or a halogenated, preferably fluorinated, derivative of alkyl, heteroalkyl, aryl or heteroaryl, R'O—, R'S—, R'R"N—, R'C(O)—, R'OC(O)—, R'C(O)O—, R'C(O)NR"—, R'R"NC(O)—, R'NHC(O)NR"—, R'SO$_2$NR"— or R'R"NSO$_2$— (in which R' and R" are independently hydrogen, alkyl, heteroalkyl, aryl, heteroaryl or a halogenated, preferably fluorinated, derivative of alkyl, heteroalkyl, aryl or heteroaryl), or R$_f$-A- (wherein R$_f$ and A are defined below);

R$_f$ is a fluorinated alkyl, fluorinated heteroalkyl, fluorinated aryl or fluorinated heteroaryl or a low/medium molecular weight fluorinated polymeric or oligomeric moiety; and A is absent or a linking chain comprising one or more of the following, connected together: —O—, —S—, —SO—, —SO$_2$—, —SO$_2$NR'—, —NR'—, —NR'CO—, —NR'COO—, —NR'CONR"—, —NR'CS—, —NR'CSO—, —NR'CSNR"—, —OC(O)—, —OCO$_2$—, —C(O)O—, —OC(O)N'R—, alkylene, arylene, and a halogenated, preferably fluorinated, derivative of alkylene or arylene, wherein R' and R" are as defined above, provided that the dyes or colorants Formula (I) and Formula (II) comprise at least about 25% by weight, preferably at least about 35% by weight and more preferably at least about 50% by weight, of fluorine and also provided that in the case of a metal phthalocyanine or naphthalocyanine dye, the source of fluorine cannot be perfluoroalkyl(s) only.

The low/medium molecular weight fluorinated polymeric or oligomeric moiety may be prepared from one or more types of fluorinated monomer such as epoxide, hydrofuran, cyclolactone, cyclolactam, acrylate, methacrylate or vinyl (including styrene, vinylether, vinylalkane and the like).

R$_f$ is preferably a low/medium molecular weight (100-100,000, preferably 200-20,000 and more preferably 400-10,000) fluorinated polymeric or oligomeric moiety. Examples of R$_f$ may include, but are not limited to, fluoropolyether and hydrofluoropolyether derived from the monomer, fluoropropylene oxide, or from the oligomer such as Krytox® K-fluids (trifluorohomopolymer) from Dupont and HT or ZT series from Solvay Solexis; and poly(chlorotrifluoroethylene) derived from the monomer, chlorotrifluoroethylene, or from the oligomer such as Halocarbon Oils from Halocarbon Product Corp. (River Edge, N.J.).

R$_f$ may also be prepared by copolymerization of fluorinated monomer(s) with non-fluorinated monomer(s).

In one embodiment, R$_f$ is a monovalent radical derived from a halogenated, especially a fluorinated, optionally substituted alkylene or alkylene oxide homopolymer or copolymer.

In another embodiment, R$_f$ is a polymeric chain derived from a fluorinated epoxide.

In a further embodiment, R$_f$ may be represented by the following Formula (A):

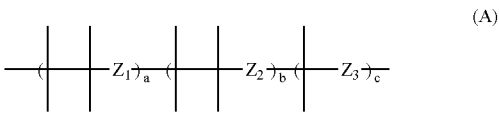

wherein the open substituent positions (not designated) on the main chain of Formula (A) can be the same or different and may independently be selected from a group consisting of hydrogen, halogen (especially fluorine), alkyl, heteroalkyl, aryl, heteroaryl or a halogenated, preferably fluorinated, derivative of alkyl, heteroalkyl, aryl or heteroaryl, —OR$^a$, —OC(O)R$^a$, —C(O)OR$^a$, —C(O)NR$^a$R$^b$ (wherein R$^a$ and R$^b$ are independently hydrogen, alkyl, heteroalkyl, aryl, heteroaryl or a halogenated, preferably fluorinated, derivative of alkyl, heteroalkyl, aryl or heteroaryl);

$Z_1$, $Z_2$, and $Z_3$ are independently oxygen or absent;

a, b and c are the weight fractions of the corresponding repeating units and are independently in the range of 0-1 with their sum no greater than 1.

The alkyl group referred to in Formula (A) may have 1-20 carbon atoms and the aryl group may have 6-18 carbon atoms.

The open substituent positions of Formula (A) are preferably hydrogen, fluorine or a fluorinated alkyl.

It will be recognized that when the preparation of the compounds of Formula (I) and Formula (II) involves the reaction of a formed phthalocyanine/naphthalocyanine or metal phthalocyanine/naphthalocyanine with reagent(s) that inserts $R^1$ groups, the resulting product may be a mixture of compounds having different degrees of $R^1$ substitution on the phthalocyanine/naphthalocyanine rings, so that m, n, p and q may be different on each of the phenyl or naphthyl moiety within a compound; and it will also be recognized that substitution may occur at different open positions on the different phenyl/naphthyl rings of the phthalocyanine/naphthalocyanine; and all such compounds are within the scope of the present invention. Furthermore, when m, n, p or q is not 0, not all $R^1$ groups need be the same, either within the compounds as a whole or even on a particular phenyl or naphthyl moiety within a compound.

It is also understood that the linking chain A may comprise one or more of the same moieties. For example, A may comprise multiple oxy (—O—) moieties, multiple alkylene moieties or multiple arylene moieties. Furthermore, the multiple alkylene moieties may be the same or different and the multiple arylene moieties may be the same or different.

In addition, when A is a linking chain, different moieties may be connected in no particular order. However, it is understood that the connection must be consistent with the principles of chemistry. How the moieties are connected is also within the general knowledge of a person skilled in the art. In some cases, the composition and order of connection in the linking chain is determined by the reagent(s) used in the synthesis of the compounds of Formula (I) and (II) or in other cases, the moieties may be connected via reactions known in the art. In one embodiment, A is absent or is a linking chain compising one or more of alkylene. In another embodiment, A is absent or is a linking chain comprising one or more of alkylene and arylene. In a further embodiment, A is absent or is a linking chain comprising one or more of —O—, alkylene and arylene. In yet a further embodiment, A is absent or is a linking chain comprising one or more of —S—, alkylene and arylene.

In one embodiment, M is Cu, Zn, Mg, Ti, Si or Sn. In another embodiment, M is Cu or Zn.

The discussions relating to $R_f$, A and M in this section are also applicable to other novel dyes and colorants disclosed throughout this application.

In one embodiment of Formula (I) or Formula (II), m, n, p and q are all 1. In another embodiment, m+n+p+q is preferably ≦4.

In one embodiment of Formula (I) or Formula (II), $R^1$ is hydrogen, alkyl or $R_f$-A-.

In one embodiment, at least one of the phenyl rings in Formula I or at least one of the naphthyl rings in Formula II is substituted with $R_f$-A-. In another embodiment, each of the phenyl rings in Formula I or each of the naphthyl rings in Formula II is substituted with a $R_f$-A-.

In a further embodiment, at least one of the phenyl rings in Formula I or at least one of the naphthyl rings in Formula II is substituted with $R_f$-A- wherein $R_f$ is a fluoroalkyl or a fluoropolyether of Formula (A). In this embodiment, A may be absent. In a further embodiment, at least one of the phenyl rings in Formula I or at least one of the naphthyl rings in Formula II is substituted with $R_f$-A- wherein $R_f$ is Formula (A) and A is absent or a linking chain comprising one or more of the following: alkylene(s) or arylene(s). In a further embodiment, A may be a linking chain comprising one or more of the following: alkylene(s), arylene(s), —O— and —$SO_2NR'$—. For example, A may be —$SO_2$NH-arylene-alkylene-, —$SO_2$NH-arylene-alkylene-O-alkylene, alkylene-O-alkylene- or —O-arylene-alkylene-arylene-alkylene-O-alkylene-. In one specific embodiment, the alkylene(s) may be independently an alkylene having 1-6 carbon atoms. In another specific embodiment, the arylene(s) is preferably a phenylene moiety.

In yet a further embodiment, at least one of the phenyl rings in Formula I or at least one of the naphthyl rings in Formula II may be substituted with $R_f$-A- and an alkyl group.

The dyes or colorants of Formula (I) normally have a substantially blue shade whereas the dyes or colorants of Formula (II) normally have a substantially green shade.

Synthesis of the Fluorinated Phthalocyanine and Naphthalocyanine Dyes or Colorants The fluorinated phthalocyanine or naphthalocyanine dyes or colorants of the present invention may be obtained by reacting, for example, $R^1X$ wherein $R^1$ is as defined above and X is a halogen, with a phthalocyanine of Formula (Ia) or a naphthalocyanine of Formula (IIa), respectively, in a pressure reactor with a glass liner at an elevated temperature. Specific examples for the synthesis of fluoropolyether substituted copper phthalocyanine dyes or colorants are given in Examples 1.1-1.4 below.

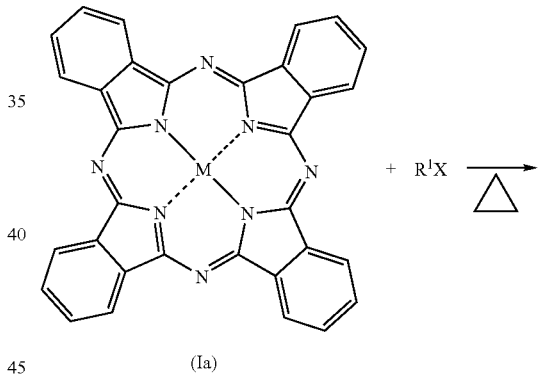

(Ia)

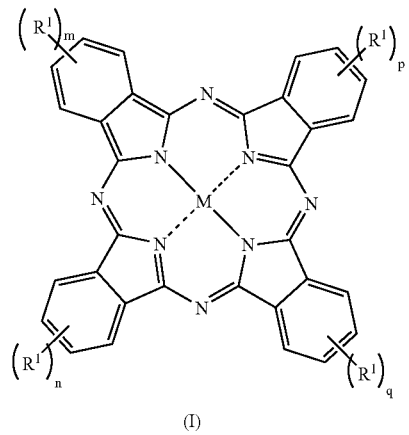

(I)

-continued

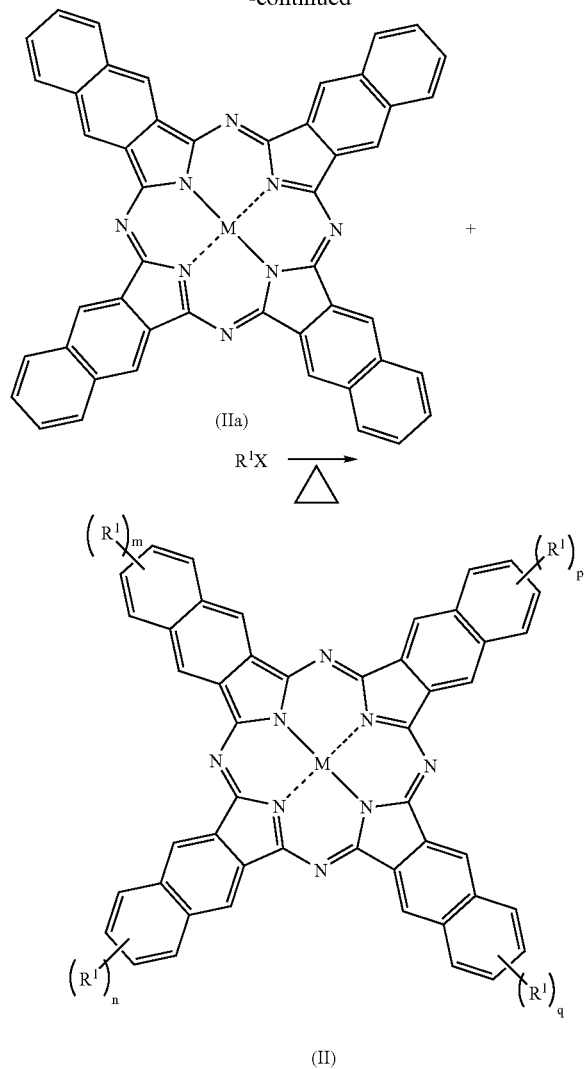

II. Fluorinated Anthraquinone Dyes or Colorants

The fluorinated anthraquinone dyes or colorants of the present invention may be expressed by the following Formula (III):

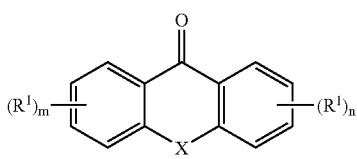

wherein:

m and n are independently 0-4;

X is C=O, NR, S, O, S=O, SO$_2$ or C=NR wherein R is hydrogen, alkyl, heteroalkyl, aryl, heteroaryl or a halogenated, preferably fluorinated, derivative of alkyl, heteroalkyl, aryl or heteroaryl, or R$_f$-A- (wherein R$_f$ and A are defined below);

R$^1$s are independently hydrogen, halogen, alkyl, heteroalkyl, aryl, heteroaryl or a halogenated, preferably fluorinated, derivative of alkyl, heteroalkyl, aryl or heteroaryl, R'O—, R'S—, R'R"N—, R'C(O)—, R'OC(O)—, R'C(O)O—, R'C(O)NR"—, R'R"NC(O)—, R'NHC(O)NR"—, R'SO$_2$NR"— or R'R"NSO$_2$— (in which R' and R" are independently hydrogen, alkyl, heteroalkyl, aryl, heteroaryl or a halogenated, preferably fluorinated, derivative of alkyl, heteroalkyl, aryl or heteroaryl), or R$_f$-A- (wherein R$_f$ and A are defined below);

R$_f$ is a fluorinated alkyl, fluorinated heteroalkyl, fluorinated aryl or fluorinated heteroaryl or a low/medium molecular weight fluorinated polymeric or oligomeric moiety; and A is absent or a linking chain comprising one or more of the following, connected together: —O—, —S—, —SO—, —SO$_2$—, —SO$_2$NR'—, —NR'—, —NR'CO—, —NR'COO—, —NR'CONR"—, —NR'CS—, —NR'CSO—, —NR'CSNR"—, —OC(O)—, —OCO$_2$—, —C(O)O—, —OC(O)N'R—, alkylene, arylene, and a halogenated, preferably fluorinated, derivative of alkylene or arylene, wherein R' and R" are as defined above, provided that the dyes or colorants Formula (I) and Formula (II) comprise at least about 25% by weight, preferably at least about 35% by weight and more preferably at least about 50% by weight, of fluorine.

When m or n is not 0, not all R$^1$s on the same phenyl moiety need be the same. The substitution(s), R$^1$, may also occur at different open positions on each of the two phenyl moieties.

In one embodiment, X is preferably C=O or NH.

In one embodiment, R$^1$ is hydrogen, alkyl or R$_f$-A-.

In another embodiment, at least one of R$^1$s is R$_f$-A-. In a further embodiment, at least one of R$^1$s is R$_f$-A- wherein R$_f$ is a fluorinated alkyl or a fluoropolyether of Formula (A). In a further embodiment, R$^1$s are independently hydrogen or R$_f$-A- in which R$_f$ is a fluorinated alkyl or a fluoropolyether of Formula (A) and A is a linking chain comprising alkylene(s). In yet a further embodiment, A is a linking chain comprising alkylene, —NH— and —NHCO—. For example, A may be —NH-alkylene-NHCO— wherein alkylene has 1-6 carbon atoms.

The fluorinated anthraquinone dyes or colorants of Formula (III) are normally of a purple or reddish color.

Syntheses of the Fluorinated Anthraquinone Dyes or Colorants

Synthesis of the fluorinated anthraquinone dyes or colorants may be accomplished by methods known in the art. For example, a fluoropolyether substituted anthraquinone may be prepared by reacting an appropriate fluoropolyether substituted reagent with 2,3-dihyro-9,10-dihydroxy-1,4-anthracenedione in a solvent. A specific example for the preparation of a fluorinated anthraquinone dye is given in Example 2 below.

III. Fluorinated Perylene Dyes or Colorants

The fluorinated perylene dyes or colorants of the present invention may be expressed by the following Formula (IV):

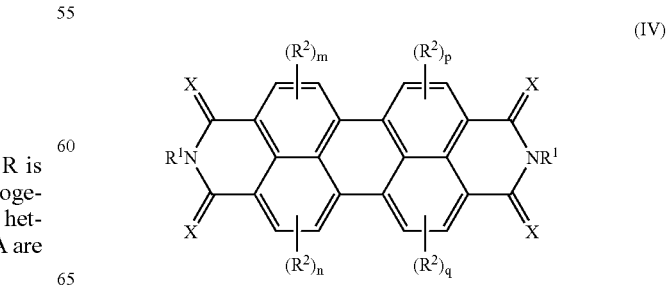

wherein:

m, n, p and q are independently 0-2;

X is O, S or NR wherein R is hydrogen, alkyl, heteroalkyl, aryl, heteroaryl or a halogenated, preferably fluorinated, derivative of alkyl, heteroalkyl, aryl or heteroaryl, or $R_f$-A- (wherein $R_f$ and A are defined below);

$R^1$s are independently hydrogen, alkyl, heteroalkyl, aryl, heteroaryl or a halogenated, preferably fluorinated, derivative of alkyl, heteroalkyl, aryl or heteroaryl, or $R_f$-A- (wherein $R_f$ and A are defined below);

$R^2$s are independently hydrogen, halogen, alkyl, heteroalkyl, aryl, heteroaryl or a halogenated, preferably fluorinated, derivative of alkyl, heteroalkyl, aryl or heteroaryl, R'O—, R'S—, R'R"N—, R'C(O)—, R'OC(O)—, R'C(O)O—, R'C(O)NR"—, R'R"NC(O)—, R'NHC(O)NR"—, R'SO$_2$NR"— or R'R"NSO$_2$— (in which R' and R" are independently hydrogen, alkyl, heteroalkyl, aryl, heteroaryl or a halogenated, preferably fluorinated, derivative of alkyl, heteroalkyl, aryl or heteroaryl), or $R_f$-A- (wherein $R_f$ and A are defined below);

$R_f$ is a fluorinated alkyl, fluorinated heteroalkyl, fluorinated aryl or fluorinated heteroaryl or a low/medium molecular weight fluorinated polymeric or oligomeric moiety; and A is absent or a linking chain comprising one or more of the following, connected together: —O—, —S—, —SO—, —SO$_2$—, —SO$_2$NR'—, —NR'—, —NR'CO—, —NR'COO—, —NR'CONR"—, —NR'CS—, —NR'CSO—, —NR'CSNR"—, —OC(O)—, —OCO$_2$—, —C(O)O—, —OC(O)N'R—, alkylene, arylene, and a halogenated, preferably fluorinated, derivative of alkylene or arylene, wherein R' and R" are as defined above, provided that the dyes or colorants Formula (I) and Formula (II) comprise at least about 25% by weight, preferably at least about 35% by weight and more preferably at least about 50% by weight, of fluorine.

When m, n, p or q is not 0, not all $R^2$s on the same phenyl moiety need be the same. The substitution(s), $R^2$, may also occur at different open positions on each of the four phenyl moieties.

In one embodiment, X is O.

In one embodiment, $R^1$ is hydrogen, alkyl or $R_f$-A-.

In one embodiment, $R^2$ is hydrogen, alkyl or $R_f$-A-.

In one of the preferred embodiments, at least one of the $R^1$s is $R_f$-A- in which $R_f$ is a fluorinated alkyl or a fluoropolyether of Formula (A). In another embodiment, at least one of the $R^1$s is $R_f$-A- in which A is absent, an alkylene or a linking chain comprising an alkylene and —NR'C(O)—. For example, A may be -alkylene-NR'CO—wherein R' may be hydrogen or an alkyl of 1-6 carbon atoms.

In another preferred embodiment, $R^2$s are all hydrogen. In another embodiment, $R^2$s are all chlorine and m, n, p and q are 1.

In a further preferred embodiment, at least one of $R^2$s is $R_f$-A- wherein $R_f$ is a fluorinated alkyl or a fluoropolyether of Formula (A) and A is independently a linking moiety comprising —S— and alkylene or a linking moiety comprising —O— and alkylene, wherein the alkylene independently has 1-6 carbon atoms.

The fluorinated perylene dyes or colorants normally are of a red color.

Synthesis of Fluorinated Perylene Dyes or Colorants

Synthesis of the fluorinated perylene dyes or colorants may be accomplished by conventional methods. For example, the fluorinated perylene dyes or colorants may be synthesized by reacting perylenetetracarboxylic dianhydride with appropriate reagents to introduce $R^1$s and $R^2$s. Specific examples for the synthesis of fluorinated perylene dyes are given in Examples 3.1-3.3 below.

IV. Fluorinated Quinacridone Dyes or Colorants

The fluorinated quinacridone dyes or colorants of the present invention may be expressed by the following Formula (V):

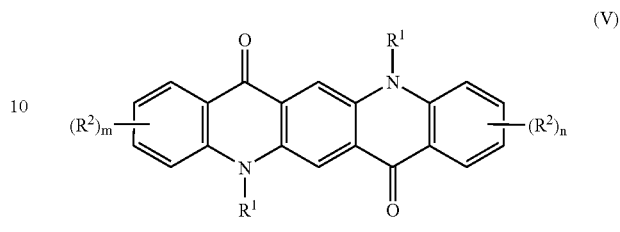

wherein:

m and n are independently 0-4;

$R^1$s are independently hydrogen, alkyl, heteroalkyl, aryl, heteroaryl or a halogenated, preferably fluorinated, derivative of alkyl, heteroalkyl, aryl or heteroaryl, or $R_f$-A- (wherein $R_f$ and A are defined below);

$R^2$s are independently hydrogen, halogen, alkyl, heteroalkyl, aryl, heteroaryl or a halogenated, preferably fluorinated, derivative of alkyl, heteroalkyl, aryl or heteroaryl, R'O—, R'S—, R'R"N—, R'C(O)—, R'OC(O)—, R'C(O)O—, R'C(O)NR"—, R'R"NC(O)—, R'NHC(O)NR"—, R'SO$_2$NR"— or R'R"NSO$_2$— (in which R' and R" are independently hydrogen, alkyl, heteroalkyl, aryl, heteroaryl or a halogenated, preferably fluorinated, derivative of alkyl, heteroalkyl, aryl or heteroaryl) or $R_f$-A- (wherein $R_f$ and A are defined below);

$R_f$ is a fluorinated alkyl, fluorinated heteroalkyl, fluorinated aryl or fluorinated heteroaryl or a low/medium molecular weight fluorinated polymeric or oligomeric moiety; and A is absent or a linking chain comprising one or more of the following, connected together: —O—, —S—, —SO—, —SO$_2$—, —SO$_2$NR'—, —NR'—, —NR'CO—, —NR'COO—, —NR'CONR"—, —NR'CS—, —NR'CSO—, —NR'CSNR"—, —OC(O)—, —OCO$_2$—, —C(O)O—, —OC(O)N'R—, alkylene, arylene, and a halogenated, preferably fluorinated, derivative of alkylene or arylene, wherein R' and R" are as defined above, provided that the dyes or colorants Formula (I) and Formula (II) comprise at least about 25% by weight, preferably at least about 35% by weight and more preferably at least about 50% by weight, of fluorine.

When m or n is not 0, not all $R^2$s on the same phenyl moiety need be the same. The substitution(s), $R^1$, may also occur at different open positions on each of the two phenyl moieties.

In one embodiment, $R^1$ is hydrogen, alkyl or $R_f$-A-.

In one embodiment, $R^2$ is hydrogen, alkyl or $R_f$-A-.

In one of the preferred embodiments, at least one of the $R^1$s and $R^2$s is $R_f$-A- in which $R_f$ is a fluorinated alkyl or a fluoropolyether of Formula (A). In another embodiment, at least one of the $R^1$s and $R^2$s is $R_f$-A- in which A is a linking chain comprising alkylene(s) and —O—. For example, A may be -alkylene-O-alkylene- wherein alkylene independently has 1-6 carbon atoms.

The fluorinated quinacridone dyes or colorants are normally of a red or reddish color.

Synthesis of Fluorinated Quinacridone Dyes or Colorants

Synthesis of the novel fluorinated quinacridone dyes or colorants may be accomplished by conventional methods. For example, bromine substituted quinacridone is usually first prepared by reacting quinacridone with N-bromosuccinimide (NBS). The fluoropolyether substituted quinacridone dyes or colorants may be prepared by a modified reaction condition based on Suzuki reaction (J. Am. Chem. Soc., 111, 314, 1989), with hydroboration of perfluoroalkyl allyl ether with 9-borabicyclo[3.3.1]nonane (9-BBN) in THF. The crude organoborane complex is then refluxed with N-(tert-butoxycarbonyl) (BOC) protected bromoquinacridone in the presence of a catalytic amount of [1,1'-bis(diphenylphosphino)ferrocene]dichloropalladium(II), complex with dichloromethane, $PdCl_2(dppf)_2 \cdot CH_2Cl_2$, and an excess of 3M aqueous NaOH, following by deprotection with trifluoroacetic acid in PFS-2. A specific example of synthesis of a fluorinated quinacridone dye is given in Example 4 below.

V. Fluorinated Diketopyrrolopyrrole Dyes or Colorants

The fluorinated DPP (diketopyrrolopyrrole) dyes or colorants of the present invention may be expressed by the following Formula (VI):

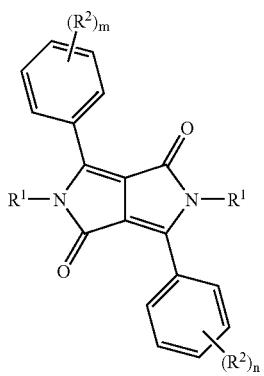

(VI)

wherein:

m and n are independently 0-5;

$R^1$s are independently hydrogen, alkyl, heteroalkyl, aryl, heteroaryl or a halogenated, preferably fluorinated, derivative of alkyl, heteroalkyl, aryl or heteroaryl, or $R_f$-A- (wherein $R_f$ and A are defined below);

$R^2$s are independently hydrogen, halogen, alkyl, heteroalkyl, aryl, heteroaryl or a halogenated, preferably fluorinated, derivative of alkyl, heteroalkyl, aryl or heteroaryl, R'O—, R'S—, R'R"N—, R'C(O)—, R'OC(O)—, R'C(O)O—, R'C(O)NR"—, R'R"NC(O)—, R'NHC(O)NR"—, $R'SO_2NR"$—, $R'R"NSO_2$— (in which R' and R" are independently hydrogen, alkyl, heteroalkyl, aryl, heteroaryl or a halogenated, preferably fluorinated, derivative of alkyl, heteroalkyl, aryl or heteroaryl, or $R_f$-A- (wherein $R_f$ and A are defined below);

$R_f$ is a fluorinated alkyl, fluorinated heteroalkyl, fluorinated aryl or fluorinated heteroaryl or a low/medium molecular weight fluorinated polymeric or oligomeric moiety; and A is absent or a linking chain comprising one or more of the following, connected together: —O—, —S—, —SO—, —$SO_2$—, —$SO_2$NR'—, —NR'—, —NR'CO—, —NR'COO—, —NR'CONR"—, —NR'CS—, —NR'CSO—, —NR'CSNR"—, —OC(O)—, —$OCO_2$—, —C(O)O—, —OC(O)N'R—, alkylene, arylene, and a halogenated, preferably fluorinated, derivative of alkylene or arylene, wherein R' and R" are as defined above, provided that the dyes or colorants Formula (I) and Formula (II) comprise at least about 25% by weight, preferably at least about 35% by weight and more preferably at least about 50% by weight, of fluorine.

When m or n is not 0, not all $R^2$s on the same phenyl moiety need be the same. The substitution(s) may also occur at different open positions on each of the two different phenyl moieties.

In one embodiment, $R^1$ is hydrogen, alkyl or $R_f$-A-. In a preferred embodiment, both $R^1$s are hydrogen.

In one embodiment, $R^2$ is hydrogen, alkyl or $R_f$-A-.

In another embodiment, at least one of $R^2$s is $R_f$-A- in which $R_f$ is a fluorinated alkyl or a fluoropolyether of Formula (A). In another embodiment, at least one of $R^2$s is $R_f$-A- in which A is a linking chain comprising alkylene(s) and —O—. For example, A may be -alkylene-O-alkylene- wherein the alkylene has 1-6 carbon atoms.

The fluorinated DPP dyes or colorants are normally of a red or reddish color.

Synthesis of Fluorinated Diketopyrrolopyrrole (DPP) Dyes or Colorants

Synthesis of the novel fluorinated DPP dyes or colorants may be accomplished by conventional means. Bromo-3,6-diphenyl-1,4-diketopyrrolopyrrole is prepared by reacting 3,6-diphenyl-1,4-diketopyrrolopyrrole with NBS (N-bromosuccinimide) in a concentrated sulfuric acid. The BOC-protected bromo-3,6-diphenyl-1,4-diketopyrrolopyrrole is prepared by refluxing a THF solution of an excess of di-tert-butyl dicarbonate and bromo-3,6-diphenyl-1,4-diketopyrrolopyrrole (Angew. Chem. Int. Ed. Engl., 23, 296, 1984). Following a procedure modified from the procedure of Suzuki (J. Am. Chem. Soc., 111, 314, 1989) with hydroboration of perfluoroalkyl allyl ether with 9-BBN in THF, the crude organoborane complex is then refluxed with the BOC-protected bromo-3,6-diphenyl-1,4-diketopyrrolopyrrole in the presence of a catalytic amount of [1,1'-bis(diphenylphosphino)ferrocene]dichloropalladium(II), complex with dichloromethane, $PdCl_2(dppf)_2 \cdot CH_2Cl_2$, and an excess of 3M aqueous $NaHCO_3$. A specific example of the synthesis of a fluorinated DPP dye is given in Example 5 below.

VI. Fluorinated Porphyrin Dyes or Colorants

The fluorinated porphyrin dyes or colorants of the present invention may be expressed by the following Formula (VII):

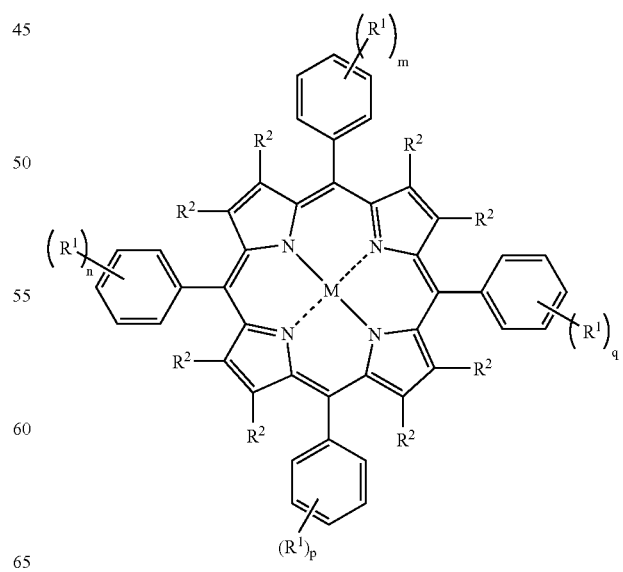

(VII)

wherein:

m, n, p and q are independently 0-5;

M is a divalent metal, an oxometal group, a halogenometal group or a hydroxymetal group;

$R^1$s and $R^2$s are independently hydrogen, halogen, alkyl, heteroalkyl, aryl, heteroaryl or a halogenated, preferably fluorinated, derivative of alkyl, heteroalkyl, aryl or heteroaryl, R'O—, R'S—, R'R"N—, R'C(O)—, R'OC(O)—, R'C(O)O—, R'C(O)NR"—, R'R"NC(O)—, R'NHC(O)NR"—, R'SO$_2$NR"—, R'R"NSO$_2$— (in which R' and R" are independently hydrogen, alkyl, heteroalkyl, aryl, heteroaryl or a halogenated, preferably fluorinated derivative of alkyl, heteroalkyl, aryl or heteroaryl), or $R_f$-A- (wherein $R_f$ and A are as defined below);

$R_f$ is a fluorinated alkyl, fluorinated heteroalkyl, fluorinated aryl or fluorinated heteroaryl or a low/medium molecular weight fluorinated polymeric or oligomeric moiety; and A is absent or a linking chain comprising one or more of the following, connected together: —O—, —S—, —SO—, —SO$_2$—, —SO$_2$NR'—, —NR'—, —NR'CO—, —NR'COO—, —NR'CONR"—, —NR'CS—, —NR'CSO—, —NR'CSNR"—, —OC(O)—, —OCO$_2$—, —C(O)O—, —OC(O)N'R—, alkylene, arylene, and a halogenated, preferably fluorinated, derivative of alkylene or arylene, wherein R' and R" are as defined above, provided that the dyes or colorants Formula (I) and Formula (II) comprise at least about 25% by weight, preferably at least about 35% by weight and more preferably at least about 50% by weight, of fluorine.

It will be recognized that the fluorinated porphyrin dyes or colorants may have more than one substitution on each of phenyl rings, the substituents ($R^1$) and the number of substituents ($R^1$) may be different on each of the phenyl rings; and it will also be recognized that substitution may occur at different positions on the phenyl rings; and all such compounds are within the scope of the present invention.

In one of the preferred embodiments, m, n, p and q are all 0.

In one embodiment, $R^1$ is hydrogen, alkyl or $R_f$-A-.

In one embodiment, $R^2$ is hydrogen, alkyl or $R_f$-A-.

In another embodiment, at least one of $R^1$s is $R_f$-A- wherein $R_f$ is a fluorinated alkyl or a fluoropolyether of Formula (A) and A is absent or a linking chain comprising —O— and alkylene(s) wherein the alkylene may independently have 1-6 carbon atoms.

In another embodiment, $R^2$s are independently hydrogen or a fluoroalkyl.

In another embodiment, $R^2$ is independently hydrogen or $R_f$-A- wherein $R_f$ is a fluorinated alkyl or a fluoropolyether of Formula (A) and A is absent, a linking moiety comprising alkylene(s) and —O— or a linking moiety comprising alkylene(s) and —S—. For example, A may be -alkylene-O-alkylene- or —S-alkylene-, in which alkylene may independently have 1-6 carbon atoms.

In a further embodiment, $R^2$ is independently hydrogen or $R_f$-A- wherein $R_f$ is a fluorinated alkyl or a fluoropolyether of Formula (A) and A is absent or a linking moiety comprising optionally substituted arylene and —NH—.

The fluorinated porphyrin dyes or colorants are normally of a yellow or reddish yellow color.

Synthesis of Fluorinated Porphyrin Dyes or Colorants

Synthesis of the fluorinated porphyrin dyes or colorants is accomplished by conventional methods. Bromine substituted porphyrin is first prepared by reacting porphyrin with N-bromosuccinimide (NBS) in chloroform (Callot, H. J. Bull.Soc. Chim. Fr. 1974, 1492). The metal insertion of bromine substituted porphyrin can be achieved by reacting with metal acetate (M(OAc)$_2$) in a MeOH and chloroform mixture. The perfluoropolyether substituted porphyrin is then prepared by a modified reaction based on the conventional Suzuki reaction (J. Am. Chem. Soc., 111, 314, 1989), with hydroboration of perfluoroalkyl allyl ether with 9-BBN in THF. The crude organoborane complex is then refluxed with BOC-protected bromoquinacridone in the presence of a catalytic amount of [1,1'-bis(diphenylphosphino)ferrocene]dichloropalladium (II), complex with dichloromethane, PdCl$_2$(dppf)$_2$.CH$_2$Cl$_2$, and an excess of 3M aqueous NaOH. Specific example of synthesis of a fluorinated porphyrin dye is given in Examples 6.1-6.4.

VII. Fluorinated Naphthalimide Dyes or Colorants

The fluorinated naphthalimide dyes or colorants of the present invention may be expressed by the following Formula (VII & IX):

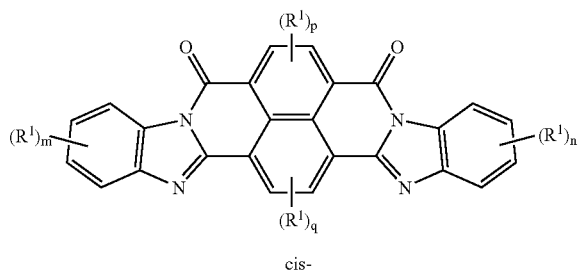

(VIII)

cis-

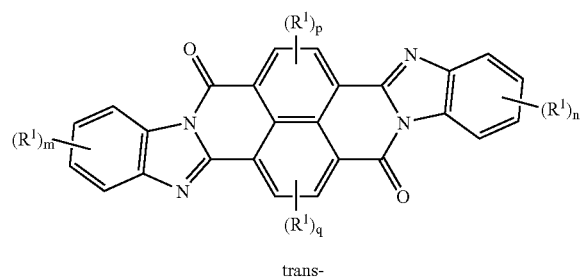

(IX)

trans-wherein:

m and n are independently 0-4; p and q are independently 0-2;

$R^1$s are independently hydrogen, halogen, alkyl, heteroalkyl, aryl, heteroaryl or a halogenated, preferably fluorinated, derivative of alkyl, heteroalkyl, aryl or heteroaryl, R'O—, R'S—, R'R"N—, R'C(O)—, R'OC(O)—, R'C(O)O—, R'C(O)NR"—, R'R"NC(O)—, R'NHC(O)NR"—, R'SO$_2$NR"—, R'R"NSO$_2$— (in which R' and R" are independently hydrogen, alkyl, heteroalkyl, aryl, heteroaryl or a halogenated, preferably fluorinated, derivative of alkyl, heteroalkyl, aryl or heteroaryl), or $R_f$-A- (wherein $R_f$ and A are as defined below);

$R_f$ is a fluorinated alkyl, fluorinated heteroalkyl, fluorinated aryl or fluorinated heteroaryl or a low/medium molecular weight fluorinated polymeric or oligomeric moiety; and A is absent or a linking chain comprising one or more of the following, connected together: —O—, —S—, —SO—, —SO$_2$—, —SO$_2$NR'—, —NR'—, —NR'CO—, —NR'COO—, —NR'CONR"—, —NR'CS—, —NR'CSO—, —NR'CSNR"—, —OC(O)—, —OCO$_2$—, —C(O)O—, —OC(O)N'R—, alkylene, arylene, and a halogenated, preferably fluorinated, derivative of alkylene or arylene, wherein R' and R" are as defined above, provided that the dyes or colorants Formula (VIII) and Formula (IX) comprise at least about 25% by weight, preferably at least about 35% by weight and more preferably at least about 50% by weight, of fluorine.

It will be recognized that the fluorinated naphthalimide dyes or colorants may have more than one substitution on each of phenyl rings, the substituents ($R^1$) and the number of substituents ($R^1$) may be different on each of the phenyl rings; and it will also be recognized that substitution may occur at different open positions on the phenyl rings; and all such compounds are within the scope of the present invention.

In one of the preferred embodiments, p and q are 0.

In one embodiment, $R^1$ is hydrogen, alkyl or $R_f$-A-.

In another embodiment, at least one of $R^1$s is $R_f$-A- wherein $R_f$ is a fluoroalkyl or a fluoropolyether of Formula (A) and A is a linking chain comprising —O— and alkylene (s) wherein the alkylene may independently have 1-6 carbon atoms.

The fluorinated naphthalimide dyes or colorants are normally of a orange or reddish color.

Synthesis of Fluorinated Naphthalimide Dyes or Colorants

Synthesis of the fluorinated naphthalimide dyes or colorants is accomplished by conventional methods. Bromine substituted naphthalimide dye is first prepared by reacting a naphthalimide dye with N-bromosuccinimide (NBS) in a mixture of trifluoroacetic acid and sulfuric acid at room temperature. The perfluoropolyether substituted naphthalimide dye is then prepared by a modified reaction based on the conventional Suzuki reaction (J. Am. Chem. Soc., 111, 314, 1989), with hydroboration of perfluoroalkyl allyl ether with 9-BBN (9-borabicyclo[3.3.1]nonane) in THF. The crude organoborane complex is then refluxed with BOC-protected bromoquinacridone in the presence of a catalytic amount of [1,1'-bis(diphenylphosphino)ferrocene]-dichloropalladium (II), complex with dichloromethane, $PdCl_2(dppf)_2 \cdot CH_2Cl_2$, and an excess of 3M aqueous NaOH. A specific example of synthesis of a fluorinated naphthalimide dye is given in Example 7.

EXAMPLES

Example 1.1

Preparation of Krytox® substituted Copper Phthalocyanine Dye (C3)

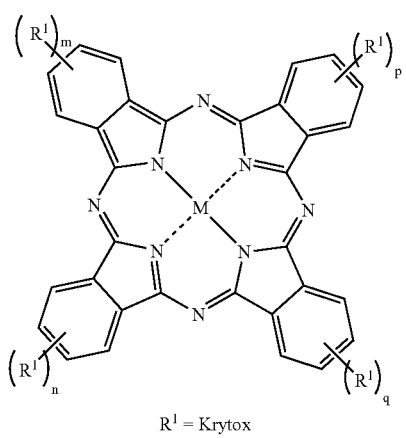

C3

$R^1$ = Krytox

Krytox = —CF$_2$CF(OCF$_2$CF)$_g$F
            |         |
           CF$_3$    CF$_3$ m, n, p, and q are independently 0-4 and m + n + p + q ≤ 4

A mixture of copper phthalocyanine (1.4 gm, 2.4 mmole, Aldrich) and Krytox® iodide (16.32 gm, 9.6 mmole, DuPont) was added into a 72 mL pressure reactor (Parr Instrument Co.) with a glass liner. The reactor was vacuum sealed under 1 Torr and heated at 350° C. for 38 hours. The crude product obtained was extracted with 250 mL of PFS-2™ in a Soxhlet extractor for 1 day. The dark blue solution thus obtained was washed with 250 mL of acetone 3 times and evaporated to a slurry by rotary evaporation (60° C.) under vacuum (~5 Torr) and then under high vacuum (~1 Torr) overnight. The slurry compound was further purified by refluxing with ether (250 mL) for 1 day and the resulting mixture was separated. The dark blue slurry was again evaporated by rotary evaporation (60° C.) under vacuum (~5 Torr) and then under high vacuum (~1 Torr) overnight. A dark blue slurry compound was obtained (6.1 gm, 63% yield). UV-Vis (HT-200): λmax=604 nm, absorbance=0.51 at 40 ppm. It was of a blue color.

Example 1.2

Preparation of Krytox® substituted Copper Tetra-tert-butyl Phthalocyanine Dye (CB2)

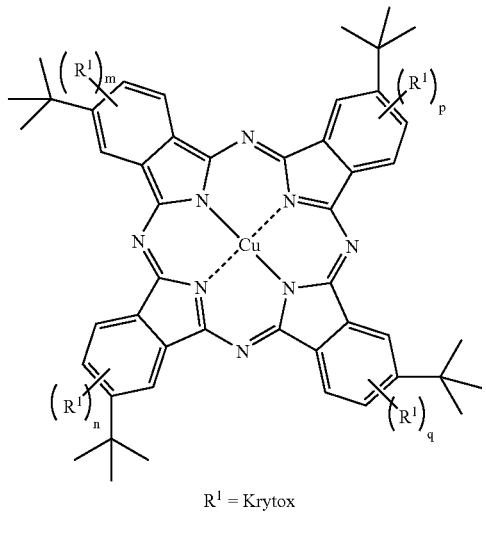

CB2

$R^1$ = Krytox

Krytox = —CF$_2$CF(OCF$_2$CF)$_g$F
            |         |
           CF$_3$    CF$_3$ m, n, p, and q are independently 0-3 and m + n + p + q ≤ 2 or 3

1. Synthesis of Brominated Copper(II) 2,9,16,23-tetra-tert-butyl-29H,31H-Phthalocyanine A mixture of copper(II) 2,9,16,23-tetra-tert-butyl-29H, 31H-phthalocyanine (1.00 gm, 1.24 mmol, Aldrich) and N-bromosuccinimide (1.00 gm, 5.61 mmol, Aldrich) was stirred in a solution of trifluoroacetic acid (50 mL, Aldrich) and H$_2$SO$_4$ (15 mL, Fisher Scientific) at room temperature for 24 hours. The resulting dark blue solution was poured into 200 mL of ice water. The solid obtained was washed with water, removed by filtration and dried (60° C., 60 Torr) overnight. A dark blue solid (1.22 gm, 86%) was obtained.

2. Synthesis of Krytox® substituted Copper(II) tetra-tert-butyl-Phthalocyanine Dye (CB2)

A solution of 25 mL (11.25 mmole) of 9-borabicyclo[3.3.1]nonane (9-BBN) in 0.45-0.50 M of tetrahydrofuran was added dropwise to, under stirring, a solution of 4 gm of Krytox® ally ether (MW=1400) (2.85 mmol, DuPont) and 10 mL of 1-(ethoxy)nonafluorobutane (ENFB, 3M) at 0° C. The resulting suspension was stirred at room temperature for 24 hours, during which time the mixture became homogeneous. 15 mL of 3M of aqueous NaOH was added to the mixture and a mixture was stirred for 30 minutes. The solution was transferred into the mixture of 0.80 gm of brominated copper(II) 2,9,16,23-tetra-tert-butyl-29H,31H-phthalocyanine (0.71 mmol) and 0.23 gm of [1,1'-Bis(diphenylphosphino)ferrocene]dichloropalladium(II), complex with dichloromethane, $PdCl_2(dppf)_2 \cdot CH_2Cl_2$, (0.19 mmol, Aldrich) under Ar and refluxed for 24 hours. The resulting mixture was extracted with 20 mL of perfluoropolyether PFS-2™ (Solvay Solexis) and washed with 10 mL of water twice and 10 mL of acetone five times. The organic layer was separated, dried with anhydrous $Na_2SO_4$ and concentrated. The residue was purified by Soxhlet extraction with ether and PFS-2™ to yield 1.30 gm (28%) of a bluish oil. UV-Vis (HT-200): λmax=605 nm, absorbance=0.60 at 40 ppm.

Example 1.3

Preparation of Krytox® substituted Copper tetrakis(4-cumylphenoxy)-Phthalocyanine Dye (CC1)

1. Synthesis of Brominated Copper(II) tetrakis(4-cumylphenoxy)-Phthalocyanine A mixture of copper(II) tetrakis(4-cumylphenoxy)phthalocyanine (1.00 gm, 0.71 mmol, Aldrich) and N-bromosuccinimide (0.60 gm, 3.37 mmol, Aldrich) was stirred in a solution of trifluoro acetic acid (50 mL, Aldrich) and $H_2SO_4$ (15 mL, Fisher Scientific) at room temperature for 24 hours. The resulting dark blue solution was poured into 200 mL of ice water. The solid obtained was washed with water, removed by filtration and dried (60° C., 60 Torr) overnight. A dark blue solid (1.10 gm, 89%) was obtained.

2. Synthesis of Krytox® Substituted Copper tetrakis(4-cumylphenoxy)-Phthalocyanine Dye (CC1)

A solution of 25 mL (11.25 mmol) of 9-borabicyclo[3.3.1]nonane (9-BBN) in 0.45-0.50M of tetrahydrofuran was added dropwise to a stirring solution of 2 gm of Krytox® ally ether (MW=1100, 1.8 mmol, DuPont) and 10 mL of 1-(ethoxy)nonafluorobutane (ENFB, 3M) at 0° C. The resulting suspension was stirred at room temperature for 24 hours, during which time the mixture became homogeneous. 15 mL of 3M NaOH aqueous solution was added to the mixture and stirred for 30 minutes. The solution was transferred into the mixture of 0.80 gm of brominated copper(II) tetrakis(4-cumylphenoxy)-phthalocyanine (0.46 mmol) and 0.23 gm of [1,1'-bis(diphenylphosphino)ferrocene]dichloropalladium(II), complex with dichloromethane, $PdCl_2(dppf)_2 \cdot CH_2Cl_2$, (0.19 mmol, Aldrich) under Ar and refluxed for 24 hours. The resulting mixture was extracted with 20 mL of perfluoropolyether PFS-2™ (Solvay Solexis) and washed with 10 mL of water twice and 10 mL of acetone five times. The organic layer was separated, dried over anhydrous $Na_2SO_4$ and concentrated. The residue was purified by Soxhlet extraction with ether and PFS-2™ to yield 1.50 gm (57%) of a bluish oil. UV-Vis (HT-200): λmax=608 nm, absorbance=0.47 at 40 ppm.

Example 1.4

Preparation of Krytox substituted Copper Tetra-sulfonamide-Phthalocyanine Dye (CS1)

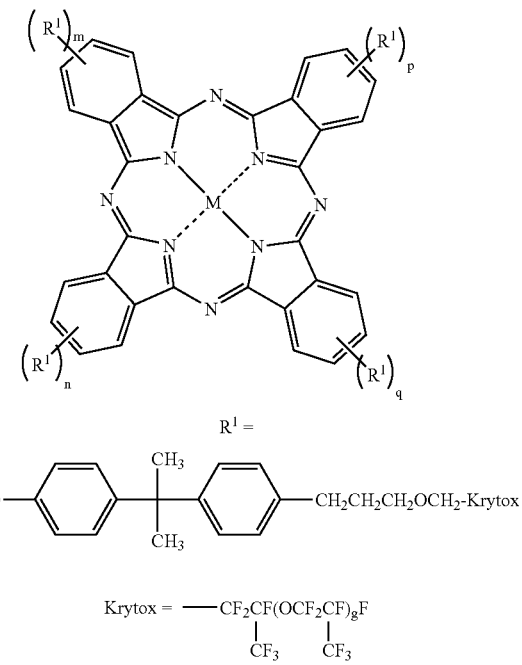

CC1

$R^1 =$

—O—⟨phenyl⟩—C(CH$_3$)$_2$—⟨phenyl⟩—CH$_2$CH$_2$CH$_2$OCH$_2$-Krytox

Krytox = —CF$_2$CF(OCF$_2$CF)$_g$F
                |            |
               CF$_3$       CF$_3$ m, n, p, and q are independently 0-4 and m + n + p + q ≤ 2 or 3

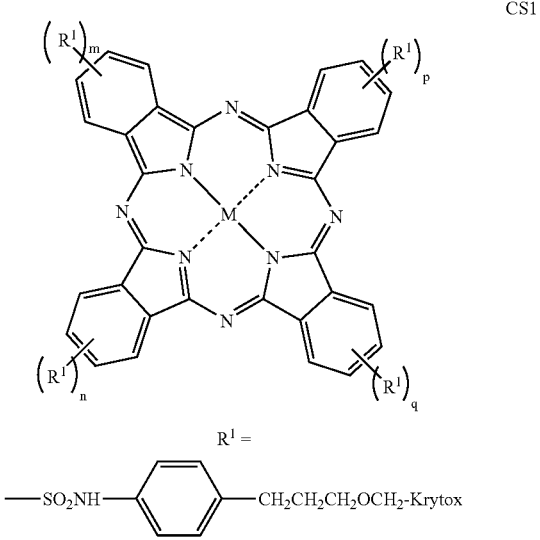

CS1

$R^1 =$

—SO$_2$NH—⟨phenyl⟩—CH$_2$CH$_2$CH$_2$OCH$_2$-Krytox

Krytox = —CF$_2$CF(OCF$_2$CF)$_g$F
                |            |
               CF$_3$       CF$_3$ m, n, p, and q are independently 0-4

1. Synthesis of Krytox® —CH$_2$OC$_3$H$_6$—C$_6$H$_4$NH$_2$

104 ML of 9-borabicyclo[3.3.1]nonane (9-BBN) in 0.45-0.50M of tetrahydrofuran was added into 35 gm of Krytox® ally ether (Mw=1400, 25 mmol, DuPont) in 40 mL of 1-(ethoxy)nonafluorobutane (ENFB, 3M) solution under Ar, and the resulting solution was stirred at room temperature for 18 hours. The excess 9-BBN was quenched by 10 mL of 6M NaOH aqueous solution, and the resulting clear solution was added dropwise into a 250 mL round-bottom flask containing 4.1 gm of the p-bromoaniline (23.8 mmol, Aldrich) and 2.0 gm of [1,1'-bis(diphenylphosphino)ferrocene]dichloropalladium(II), complex with dichloromethane, PdCl$_2$(dppf)$_2$.CH$_2$Cl$_2$, at 0° C. under Ar. The mixture obtained was refluxed for 24 hours under Ar. After cooling down, the mixture obtained was extracted with 75 mL of PFS-2™ four times. The combined PFS-2™ extracts were washed with acetone and dried over anhydrous Na$_2$SO$_4$. After removal of the solvent, 27.8 gm of a brown oil was obtained and used in the next step.

2. Synthesis of Sulfochlorinated Copper Phthalocyanine

A method modified according to International Patent Application WO 98/45756 was used. 20 Gm of copper phthalocyanine was added into a 500 mL flask containing 85 mL of chlorosulfonic acid and the resulting solution was heated to 140° C. under Ar and was stirred at 140° C. for 2 hours. The solution obtained was then cooled to 90° C. and 25 mL of thionyl chloride was added dropwise over a period of 10 minutes, and the mixture was stirred at 85° C. for 18 hours. The resulting dark green solution was added dropwise into a mixture of 600 mL of ground ice and 600 mL of water while stirring. The resulting blue suspension was filtered. The solid obtained was washed with 500 mL of water and dried with suction. 93.5 Gm of crude sulfochlorinated copper phthalocyanine was used immediately.

3. Synthesis of Krytox® substituted Copper Tetra-sulfonamide-Phthalocyanine (CS1)

A mixture containing 5.1 gm of crude sulfochlorinated copper phthalocyanine, 15.1 gm of Krytox® —CH$_2$OC$_3$H$_6$—C$_6$H$_4$NH$_2$, 100 mL of N,N-dimethyl acetamide and 10 mL of ZT 130™ (Solvay Solexis) was refluxed for 2 days. The resulting solution was added into 100 mL of water, and the mixture obtained was extracted with 50 mL of PFS-2™ four times. The combined PFS-2™ extracts were washed with acetone, dried over anhydrous Na$_2$SO$_4$ and rotary evaporated to dryness under vacuum. 2.5 gm of a dark blue solid was obtained. UV-Vis (HT-200): λmax=622 nm and Absorbance=0.47 at 40 ppm.

Example 2

Preparation of Krytox® Substituted Anthraquinone Dye (Q3)

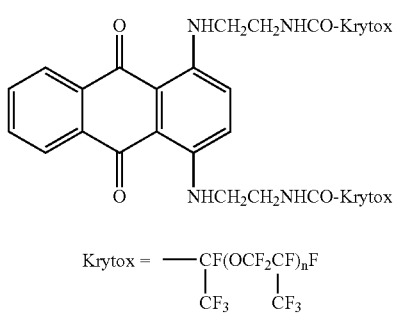

1. Synthesis of Krytox® Amine

In a 250 mL round-bottomed flask fitted with an additional funnel and a calcium guard tube were placed 24 gm (300 mmol) of ethylenediamine, 50 mL of 1-(ethoxy)nonafluorobutane (ENFB, 3M) and 20 mL of isopropyl alcohol. 42 Gm (30 mmol) of Krytox® methyl ester was dissolved in 70 mL of 1-(ethoxy)nonafluorobutane (ENFB, 3M) and the resulting solution was added dropwise into the solution in the round-bottomed flask during a 2 hour period at room temperature. After addition, the mixture was stirred for 20 hours at room temperature. The solvent was removed by rotator evaporator under vacuum, after which 150 mL of PFS-2™ was added. The mixture was washed with 50 mL of methanol 3 times and 50 mL of ethyl acetate twice. After removal of the solvent and drying under vacuum, a viscous oil of about 39 gm (yield 90%) was obtained. $^1$H NMR (400 MHz, CDCl$_3$): δ 7.35 (s, 1H, —CONH), 3.4(t, 2H, —CH$_2$NCO), 2.9 (t, 2H, CH$_2$N), 1.2 (bs, 2H, NH$_2$). IR (KBr) (cm-1): 3400, 3200, 1690

2. Synthesis of Fluorinated Anthraquinone Dye (Q3)

0.56 Gm (2.3 mmol) of 2,3-dihyro-9,10-dihydroxy-1,4-anthracenedione, 8.7 gm (6 mmole) of Krytox® amine prepared above and 0.12 gm (2 mmol) of boric acid were dissolved in a mixture of 50 mL of isopropyl alcohol and 50 mL of 1-(ethoxy)nonafluorobutane (ENFB, 3M). The solution was stirred and refluxed for 20 hours. After evaporation of the solvent and addition of 300 mL of water, 300 mL of 7% NaOH aqueous solution was slurred in and the mixture was heated to boiling in a 40 minute period followed by refluxing for one additional hour. After cooling down, 400 mL of a saturated NH$_4$Cl aqueous solution was added and the mixture was extracted with 75 mL of PFS-2™ 3 times. The combined PFS-2™ extracts were washed with acetone. A purple oil of 3 gm (25%) was obtained after removal of the solvent. UV-Vis (HT-200): λmax=573 nm and Absorbance=0.17 at 40 ppm.

Example 3.1

Preparation of Fluorinated Perylene Dye (P-6B)

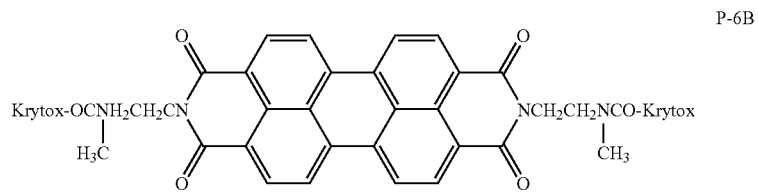

P-6B

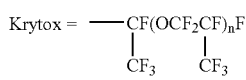

1. Synthesis of Krytox® Substituted Perylenetetracarboxylic Diimide 0.9 Gm (3 mmol) of perylenetetracarboxylic dianhydride, 15 gm of Krytox® amine (from Example 2) and 0.5 gm of Zn(OAc)$_2$ were dissolved in a mixture of 50 mL of ZT 130™ and 50 mL of 1-methyl-2-pyrrolidinone (NMP). The mixture was refluxed under Ar for 20 hours. After cooling down, the solution was poured into 200 mL of a 3N HCl aqueous solution and the resulting mixture was extracted with 75 mL of PFS-2™ three times. The combined PFS-2™ extracts were washed with acetone to remove un-reacted starting materials. After removal of the solvent, 13 gm of a crude product was obtained to be used in the next step directly.

2. Synthesis of P-6B

13 Gm (10 mmol) of the above crude product was dissolved in a mixture of 50 mL of 1-(ethoxy)nonafluorobutane (ENFB, 3M) and 50 mL of THF which was dried by refluxing with sodium. 0.72 Gm of sodium hydride was added under Ar. The mixture was refluxed for 2 hours and then to which 9.3 gm (50 mmol) of methyl p-toluenesulfonate was added. The mixture was further refluxed for 20 hours. After cooling down, it was poured into 200 mL of a 3N HCl aqueous solution and extracted with 75 mL of PFS-2™ three times. The combined PFS-2™ extracts were washed with acetone to remove the un-reacted starting materials. The PFS-2™ solution was then mixed with 15 gm of Celite 540, after the solvent was removed and the residue was put into a Soxhlet thimble. The solution was first refluxed with ether and then with PFS-2™ to retrieve the desired product. After removal of the solvent, a reddish solid of 8 gm was obtained. UV-Vis (HT-200): λmax=508 nm and absorbance=0.5 at 40 ppm.

Example 3.2

Preparation of Krytox® Substituted Perylene (PT-2)

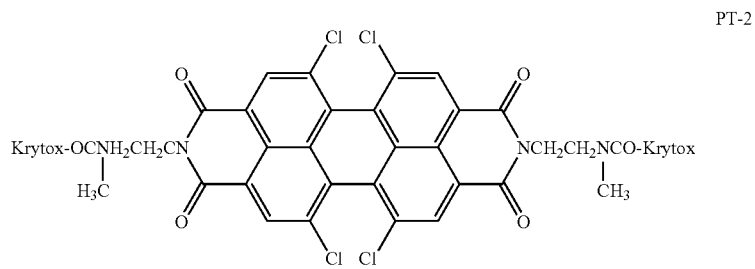

PT-2

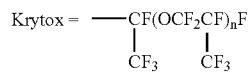

1. Synthesis of Krytox® Substituted Perylenetetracarboxylic Diimide 1.56 Gm (3 mmole) of 5,6,12,13-tetrachloro-perylenetetracarboxylic dianhydride, 15 gm Krytox® amine (from Example 2) and 0.5 gm Zn(OAc)$_2$ were dissolved in a mixture of 50 mL of ZT 130™ and 50 mL of 1-methyl-2-pyrrolidinone (NMP). The solution was refluxed under Ar for 20 hours. After cooling down, the solution was poured into 200 mL of a 3N HCl aqueous solution and then extracted with 75 mL of PFS-2™ three times. The combined PFS-2™ extracts were washed with acetone to remove the un-reacted starting materials. After removal of the solvent, 10 gm of crude product was obtained to be used in the next step directly.

2. Synthesis of PT-2

10 Gm (8 mmol) of the above crude product was dissolved in a mixture of 50 mL of 1-(ethoxy)nonafluorobutane (ENFB, 3M) and 50 mL of THF which was dried by reflux with sodium. 0.72 Gm of sodium hydride was added under Ar and the mixture was refluxed for 2 hours and then to which 9.3 gm (50 mmol) of methyl p-toluenesulfonate was added. The mixture was refluxed for another 20 hours. After cooling down, the mixture was poured into 200 mL of a 3N HCl aqueous solution and extracted with 75 mL of PFS-2™ three times. The combined PFS-2™ extracts were washed with acetone to remove the un-reacted starting materials. The PFS-2™ solution was mixed with 15 gm of Celite 540. After the solvent was removed and the residue was placed into a Soxhlet thimble. The mixture was first refluxed with ether then with PFS-2™ to retrieve the desired product. After removal of the solvent, 6 gm of a reddish solid was obtained. UV-Vis (HT-200): λmax=508 nm and absorbance=0.28 at 40 ppm.

Example 3.3

Preparation of Perfluoroalkylated Perylene (R30)

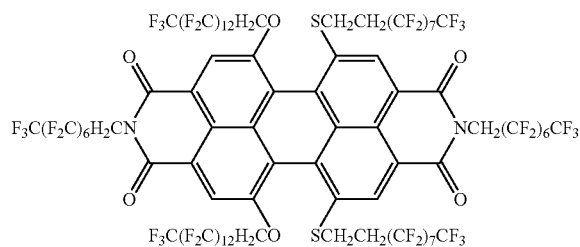
(R30)

1. Synthesis of Tetrachloro-Perylene-Diimide

A mixture of 5.3 gm (10 mmol) tetrachloro-perylenetetracarboxylic dianhydride, 1.6 gm $Zn(OAc)_2$ and 12 gm 1H, 1H-Perfluorooctylamine (30 mmol, SynQuest) were dispersed in 70 mL of 1-methyl-2-pyrrolidinone (NMP). It was stirred at 200° C. under Ar for 20 hours. After it was cooled down, it was poured into 300 mL of 1 N HCl aqueous solution. The solution was filtered and a solid cake was washed with water (100 mL) and MeOH (200 mL). It was then dried at 50° C. for 18 hours under vacuum. It gave 12 gm (yield: 96%) of a solid which was used directly in the next step.

2. Synthesis of R30

A mixture of 6 gm (5 mmol) of tetrachloro-perylenetetracarboxylic diimide, 10.5 gm of 1H, 1H-Perfluoro-1-tetradecanol (15 mmol, SynQuest) and 2.1 gm of $K_2CO_3$ were dispersed in a solution of 75 mL of 1-methyl-2-pyrrolidinone (NMP) and 75 ml of ZT 130™, and it was stirred at 120° C. under Ar for 12 hours. 4.8 Gm of 1H,1H,2H,2H-Perfluorodecyl-1-thiol (10 mmol, SynQuest) and 1.38 g of $K_2CO_3$ were added into the reaction mixture. The reaction continued at 120° C. under Ar for another 12 hours. After it was cooled down, it was poured into 300 mL of 1N HCl aqueous solution and 300 mL of PFS-2™ extraction. The PFS-2™ layer was washed with acetone (4×50 mL) till the color of acetone layer was light. The PFS-2™ solution was filtered through a filtration funnel which was packed with silica-gel. After the solvent was removed, 5.5 gm of the product was obtained. UV-Vis spectra (HT-200): λmax=522 nm and absorbance=0.34 at 40 ppm.

Example 4

Preparation of Krytox® Substituted Quinacridone (QN-7)

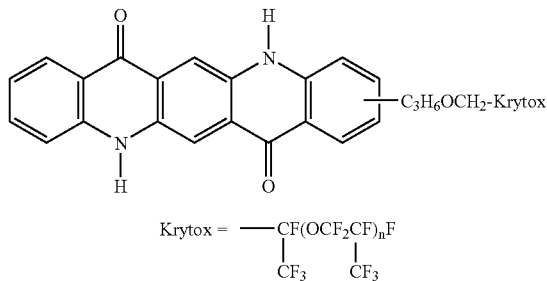

1. Synthesis of Krytox® —$CH_2OC_3H_6$-9-BBN

70 ML of 9-borabicyclo[3.3.1]nonane (9-BBN) in 0.45-0.50M of tetrahydrofuran solution was added into 14 gm of Krytox® ally ether (Mw=1400) in 20 mL of 1-(ethoxy)nonafluorobutane (ENFB) solution under Ar, and the resulting solution was stirred at room temperature for 18 hours. A clear solution containing Krytox® —$CH_2OC_3H_6$-9BBN was used directly in the reaction.

2. Synthesis of Bromine substituted Quinacridone 6.2 Gm (20 mmole) of quinacridone was dissolved in 80 mL of sulfuric acid and 120 mL of trifluoroacetic acid. 3.5 Gm of N-bromosuccinimide was added into the solution in 3 portions in a 1 hour period. The mixture was stirred at room temperature for 2 days and then poured into 300 mL of deionized water and filtered under vacuum. The solid obtained was washed with water and acetone and dried at 60° C. under vacuum for 1 day. 7.2 Gm (90% yield) of a purple solid was obtained and was used directly in the next step.

3. Synthesis of BOC-protected Bromoquinacridone 3.9 Gm (10 mmole) of the above crude product and 0.6 gm of 4-dimethylaminopyridine were dissolved in 50 mL of DMF. 7 Gm (32 mmol) of di-tert-butyl dicarbonate was added into the mixture and the resulting mixture was sonicated for 4 hours. The color changed from purple to greenish-yellow. The mixture was then poured into 150 mL of water and the precipitate was filtered under vacuum. The solid was washed with water and dried at 40° C. under vacuum. 5 Gm of a yellow solid was obtained and used directly in the next step.

4. Synthesis of QN-7

Into a 250 mL round-bottom flask, 5 gm (9 mmol) of the above crude product and 0.9 gm of [1,1'-bis(diphenylphosphino)ferrocene]dichloropalladium(II), complex with dichloromethane, $PdCl_2(dppf)_2 \cdot CH_2Cl_2$, were charged under Ar. A solution containing Krytox® —$CH_2OC_3H_6$-9-BBN (10 mmol) was added dropwise at 0° C. under Ar. The mixture obtained was stirred at room temperature for 20 hours and quenched by 6 mL of 6N NaOH aqueous solution. The resulting mixture was refluxed for 24 hours under Ar. After cooling down, 150 mL of 3N HCl solution was added and the mixture obtained was extracted with 75 mL of PFS-2™ three times. The combined PFS-2™ extracts were washed with acetone.

To the above PFS-2™ solution was added 60 mL trifluoroacetic acid and stirred at room temperature for 1 day. The reaction solution was poured into 200 mL of water and the PFS-2™ layer was washed with a saturated $NaHCO_3$ aqueous solution and acetone. Finally it was mixed with 10 gm of Celite 540. After the solvent was removed, the residue was put into a Soxhlet thimble and first extracted with ether and then with PFS-2™ to retrieve the final product. After removal of the solvent, 2 gm of a magenta solid was obtained. UV-Vis (HT-200): λmax=558 nm and absorbance=0.66 at 40 ppm.

Example 5

Preparation of Krytox® Substituted 3,6-Diphenyl-1,4-diketopyrrolopyrrole (DP-5)

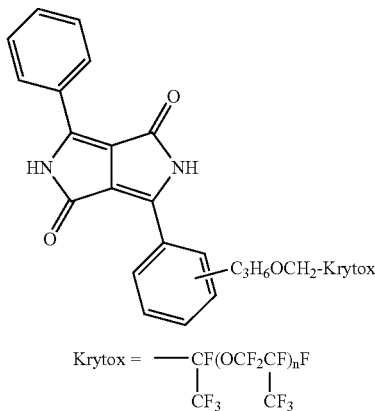

DP-5

1. Synthesis of Krytox®—CH$_2$OC$_3$H$_6$-9-BBN

42 ML of 9-borabicyclo[3.3.1]nonane (9-BBN) in 0.45-0.50M of tetrahydrofuran solution was added into 8.4 gm of Krytox® ally ether (Mw=1400, 6 mmol, DuPont) in 10 mL of 1-(ethoxy)nonafluorobutane (ENFB) solution under Ar, and the resulting solution was stirred at room temperature for 18 hours. The clear solution containing Krytox®—CH$_2$OC$_3$H$_6$-9-BBN was used directly in the next step.

2. Synthesis of Bromo-3,6-diphenyl-1,4-diketopyrrolopyrrole 5.7 Gm (20 mmol) of 3,6-diphenyl-1,4-diketopyrrolopyrrole was dissolved in 100 mL of sulfuric acid. 3.5 Gm of N-bromosuccinimide (NBS) was added in 3 portions in a one hour period. The mixture obtained was stirred at room temperature for 2 days and poured into 300 mL of deionized water and the precipitate formed was filtered under vacuum. The solid obtained was washed with water and acetone and dried at 60° C. under vacuum for 1 day. 5.9 Gm (80% yield) of a red solid was obtained and used directly in the next step.

3. Synthesis of BOC-protected Bromo-3,6-diphenyl-1,4-diketopyrrolopyrrole 3.6 Gm (10 mmol) of the above crude product and 0.6 gm of 4-dimethylaminopyridine were dissolved in 80 mL of THF. 7 Gm (32 mmol) of di-tert-butyl dicarbonate was added into the mixture and refluxed under Ar for 20 hours. The color changed from red to greenish-yellow. The solvent was then stripped under vacuum followed by addition of 150 mL of water and the precipitate was filtered under vacuum. The solid was washed with water and dried at 40° C. under vacuum. 2.8 Gm of a yellow solid was obtained and used directly in the next step.

4. Synthesis of DP-5

Into a 250 mL round-bottom flask, 2.5 gm (5 mmole) of the above crude product and 0.5 gm of [1,1'-bis(diphenylphosphino)ferrocene]dichloropalladium(II), complex with dichloromethane, PdCl$_2$(dppf)$_2$.CH$_2$Cl$_2$, were charged under Ar. A solution containing Krytox®—CH$_2$OC$_3$H$_6$-9-BBN (6 mmol) was added dropwise at 0° C. under Ar. The resulting mixture was stirred at room temperature for 20 hours and was quenched with 7 mL of water and 2.5 gm of NaHCO$_3$ (30 mmol). The mixture obtained was refluxed for 24 hours under Ar. After cooling down, 150 mL of 3N HCl aqueous solution was added and the resulting mixture was extracted with 75 mL PFS-2™ three times. The combined PFS-2™ extracts were washed with acetone. The resulting PFS-2™ solution was added 60 mL of trifluoroacetic acid and stirred at room temperature for 1 day. The reaction solution was poured into 200 mL of water, and the PFS-2™ layer was separated, washed with a saturated NaHCO$_3$ aqueous solution and acetone and mixed with 10 gm of Celite 540. After removal of the solvent, the residue was added into a Soxhlet thimble and first extracted with ether and then with PFS-2™ to retrieve the final product. After removal of the solvent, 0.9 gm of a red solid was obtained. UV-Vis (HT-200): λmax=528 nm, and absorbance=0.18 at 40 ppm.

Example 6.1

Preparation of Krytox® substituted 2,3,12,13-Tetraphenyl-Copper-Porphyrin (PK1)

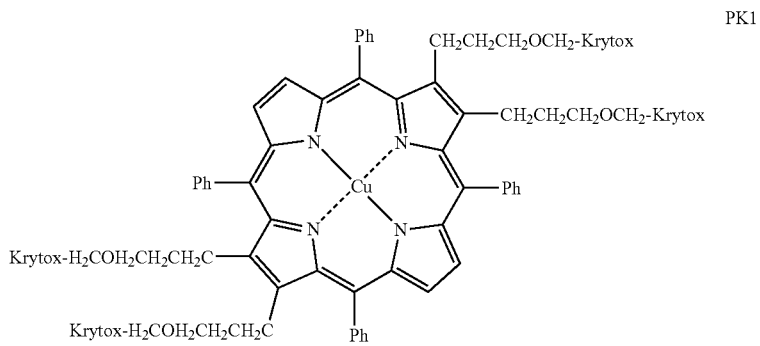

PK1

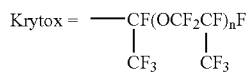

1. Synthesis of 2,3,12,13-tetrabromo-5,10,15,20-tetraphenyl-22H,24H-porphyrin N-Bromosuccinimide (NBS) (4.34 gm, 24.4 mmol) was added to a refluxing solution of tetraphenylporphyrin (2.5 gm, 4.07 mmol) in 150 mL of chloroform (ethanol free). The mixture was kept refluxing overnight. It was then cooled down. The volume of the solvent was reduced by ⅔ using roto-vap under reduced pressure. The resulting mixture was then subjected to a short alumina plug (grade III). The impurities were washed out with dichloromethane, while the desired compound was remained on top of the plug. The compound was washed down using a mixture of dichloromethane and trifluoroacetic acid (ratio: 3 to 1) and neutralized with triethylamine. The volume of the solvent was reduced. The desired compound was crystallized by partition of MeOH. Yield, 3.6 gm, 94%.

2. Synthesis of 2,3,12,13-Tetrabromo-5,10,15,20-Tetraphenyl-Copper(II)-Porphyrin 2,3,12,13-Tetrabromo-5,10,15,20-tetraphenyl-22H,24H-porphyrin (1.3 gm, 1.4 mmol) was dissolved in chloroform (110 mL), to which $Cu(OAc)_2$ (2.23 gm, 11.2 mmol) in MeOH (30 mL) was added. The resulting mixture was heated to reflux for one day. It was then cooled down. The solvent was removed and the residue was sonicated with MeOH. After filtration, the solid, which was the aimed compound, was washed with MeOH and water until the washing was colorless. The product was obtained as purple crystals. Yield, 1.3 gm, 94%.

3. Synthesis of PK1

45 ML of 9-borabicyclo[3.3.1]nonane (9-BBN) in 0.45-0.50M of tetrahydrofuran solution was added dropwise to a solution of 5.6 gm of Krytox® allyl ether (Mw=1400, 4.0 mmol, DuPont) in 1-(ethoxy)nonafluorobutane (ENFB, 3M) (20 mL) at 0° C. under argon. After the addition was complete, the resulting mixture was stirred overnight at room temperature under argon. 5.5 ML of 6N NaOH aqueous solution was added to quench excess 9-BBN. To this solution, [1,1'-bis(diphenylphosphino)ferrocene]-dichloropalladium (II), complex with dichloromethane, $PdCl_2(dppf)_2 \cdot CH_2Cl_2$, and 2,3,12,13-tetrabromo-5,10,15,20-tetraphenylporphyrin-Cu(II) (0.9 gm, 0.90 mmol) were added. Argon was then bubbled through this solution for 5 minutes. This mixture was heated to reflux for 4 days. Water was added after the mixture was cooled down and the resulting mixture was then extracted with PFS-2™. The PFS-2™ layer was washed with water and acetone until the washing was colorless. The crude compound was purified on a short silica plug eluting first with PFS-2™ to wash out all the impurities, and the product was washed down with PFS-2™/diethyl ether (1:2). After the solvent was removed, the desired compound was obtained as a red sticky solid. Yield, 2.38 gm, 40%. UV-Vis (HT-200): ?max=423 nm, and absorbance=2.40 at 40 ppm.

Example 6.2
Preparation of Perfluoroalkylated Tetraphenyl-Copper-Porphyrin I (PS1)

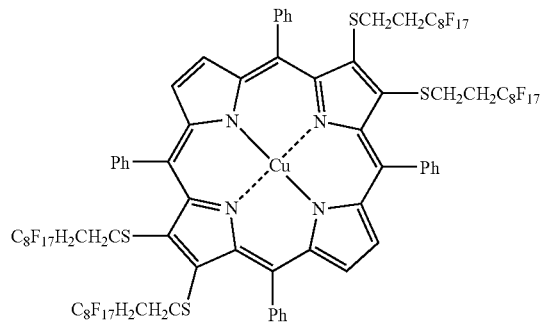

(PS1)

Synthesis of PS1

2,3,12,13-Tetrabromo-5,10,15,20-tetraphenyl-copper(II)-porphyrin (1.0 gm, 1.0 mmol), 1H,1H, 2H,2H-perfluorodecyl-1-thiol (2.9 gm, 6 mmol, SynQuest), potassium carbonate (0.9 gm, 6.5 mmol) and 50 mL of 1-methyl-2-pyrrolidone (NMP) were mixed and heated at 160° C. for two days. The resulting solution was extracted with 200 mL PFS-2™, and the obtained PFS-2™ solution was washed with 100 mL of water twice and 100 mL of acetone twice. The resulting PFS-2™ solution was loaded into a Buchner filter funnel filled with 100 mL of silicagel and a dark green solution was obtained by washing with PFS-2™-ether solution (ratio, 2:1), evaporated to dryness by rotary evaporator. A dark green solid was obtained, further washed with 100 mL of acetone by ultra-sonication three times and vacuum dried. 1.2 Gm of the desired product was obtained with 30% yield. UV-Vis (HT-200): λmax=436 nm, and absorbance=1.20 at 40 ppm.

Example 6.3

Preparation of Perfluoroalkylated Tetraphenyl-Copper-Porphyrin II (PS5)

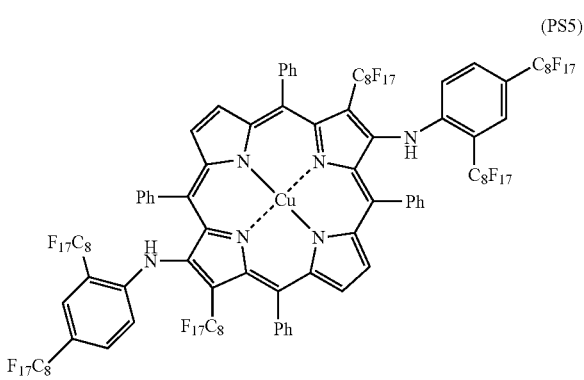

(PS5)

1. Synthesis of Dibromo-N,N'-bis-(2,4-Dibromophenyl)-5,10,15,20-Tetraphenyl-Copper(II)-Porphyrin-Diamine 2,3,12,13-Tetrabromo-5,10,15,20-tetraphenyl-copper(II)-porphyrin (1.0 gm, 1.0 mmol), 2,6-dibromoaniline (0.68 g, 2.7 mmol), potassium carbonate (0.9 gm, 6.5 mmol), and 10 mL of 1-methyl-2-pyrrolidone (NMP) were mixed and heated at 150° C. overnight, then cooled, mixed with 200 mL of water, and filtered. The resulting solid was washed with 100 mL of MeOH and vacuum dried. 1.0 Gm of the desired product was obtained with 75% yield.

2. Synthesis of PS5

Dibromo-N,N'-bis-(2,4-dibromo-phenyl)-5,10,15,20-tetraphenyl-copper(II)-porphyrin-diamine (0.5 g, 0.35 mmol), perfluorooctyl iodide (1.7 g, 3.2 mmol, SynQuest), copper granule (0.41 gm, 6.3 mmol), 5 mL of DMSO, and 5 mL of ZT-130™ (Solvay) were mixed and heated at 150° C. overnight, then cooled and extracted with 200 mL of PFS-2™. The resulting PFS-2™ solution was loaded into a Buchner filter funnel filled with 100 mL of silicagel and a dark green solution was obtained by washing with PFS-2™. The obtained PFS-2™ solution was washed with 100 mL of 2-butanone (MEK) twice and evaporated to dryness by rotary evaporator. A dark green solid was obtained which was further washed with 100 mL of hot methanol and vacuum dried. 0.48 Gm of the desired product was obtained with 41% yield. UV-Vis (HT-200): λmax=428 nm, and absorbance=0.36 at 4 ppm.

Example 6.4

Preparation of Krytox® substituted Tetraphenyl-5,10,15,20-Copper-Porphyrin (CT 1)

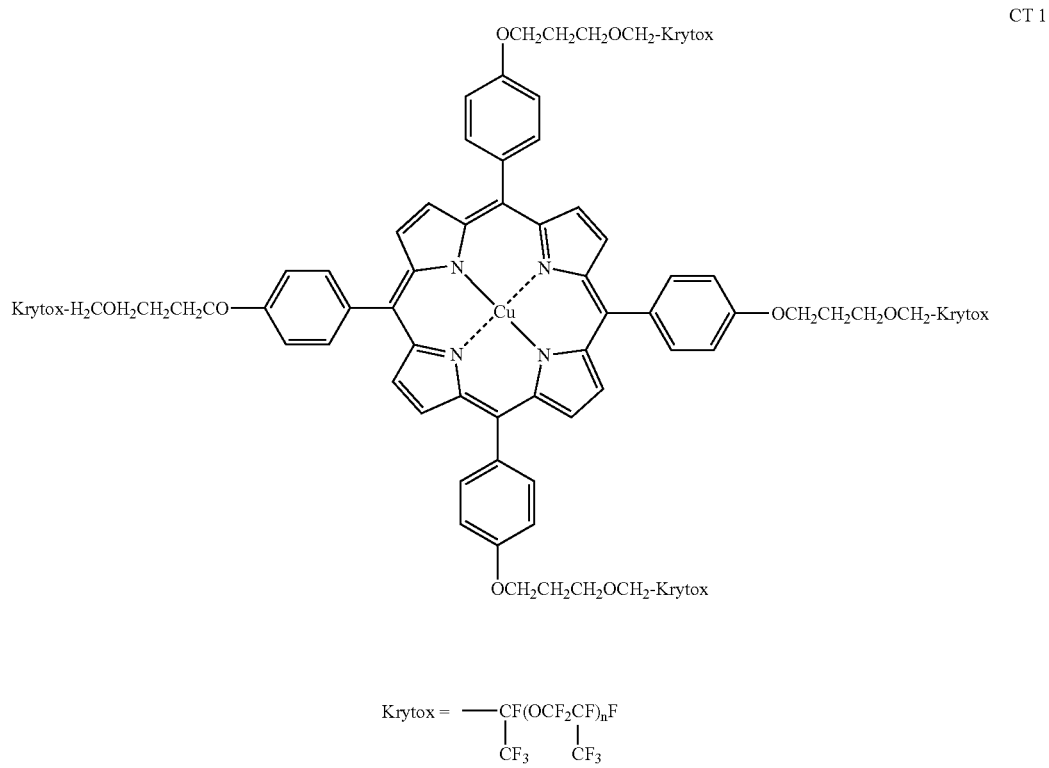

CT 1

1. Synthesis of Krytox® —CH$_2$OCH$_2$CH$_2$CH$_2$OH

400 ML of 9-borabicyclo[3.3.1]nonane (9-BBN) in 0.45-0.50M of tetrahydrofuran solution (0.18 mol, Gallery Chemical) was dropwise added into a solution of 56 gm of Krytox® allyl ether (Mw=1400, 0.04 mmol, DuPont) in 70 mL 1-(ethoxy)nonafluorobutane (ENFB) in ice-water bath. After addition, the resulting solution was stirred at room temperature for 2 days. The solution obtained was mixed with 110 mL of ethanol, 40 mL of a 6N NaOH aqueous solution and 110 mL of water, and then refluxed for 2 days. The resulting suspension was concentrated by rotary evaporation, and extracted with 75 mL of PFS-2™ three times. The PFS-2™ extracts were combined, washed with 50 mL acetone three times and concentrated by rotary evaporation. 50 Gm of a colorless oil was obtained. (Yield: 88%)

2. Synthesis of Krytox® —CH$_2$OCH$_2$CH$_2$CH$_2$OT$_f$ 6.3 Gm of trifluoromethanesulfonic anhydride (22.3 mmol, Aldrich) in 20 mL trifluorotrichloroethane was dropwise added into a solution of 25 gm of Krytox®—CH$_2$OCH$_2$CH$_2$CH$_2$OH (17.8 mmol) and 2.4 gm of Lutidine (22.3 mmol, Aldrich) in 150 mL of trifluorotrichloroethane in an ice-water bath. After addition, the resulting solution was stirred at room temperature for 18 hours, concentrated by rotary evaporation and then extracted with 100 mL of PFS-2™ three times. The PFS-2™ extracts were combined, washed with 75 mL of acetone three times and concentrated by rotary evaporation. 22 Gm of an oily product was obtained with 84% yield.

3. Synthesis of 5,10,15,20-Tetrakis(4-Hydroxyphenyl)-Copper(II)-Porphyrin

A solution of 1.0 gm of 5,10,15,20-tetrakis(4-hydroxyphenyl)-21H,23H-porphine (1.47 mmol, Aldrich) and 0.2 gm of copper acetate (1.76 mmol, Aldrich) in 50 mL of DMF was refluxed for 18 hours. The resulting solution was mixed with 200 mL of water and filtered. The solid residue was washed with 150 mL of water and dried at 60° C. under vacuum. 1.1 Gm of a solid was obtained with 95% yield.

4. Synthesis of CT 1

24 Mg of sodium hydride (1.0 mmol, Aldrich) was added into a solution of 0.3 gm of 5,10,15,20-tetrakis(4-hydroxyphenyl)-copper(II)-porphyrin in 50 mL of anhydrous THF. The resulting suspension was refluxed for 2 hours, to which a solution of 1.0 gm of Krytox® —CH$_2$OCH$_2$CH$_2$CH$_2$OT$_f$ in 10 mL of 1-(ethoxy)nonafluorobutane (ENFB, 3M) was added and then refluxed for another 18 hours. The suspension obtained was mixed with 100 mL of a 1 N HCl aqueous solution, and extracted with 50 mL of PFS-2™ three times. The PFS-2™ extracts were combined, washed with 50 mL of acetone three times and concentrated by rotary evaporation. The resulting oil was mixed with 20 gm of Celite, Soxhlet extracted with 150 mL of ether for 1 day and then Soxhlet extracted with 150 mL of PFS-2™ for 1 day. The PFS-2™ solution obtained was evaporated to dryness by rotary evaporation. 0.3 Gm of the product was obtained. UV-Vis(HT 200): λmax=418 nm and absorbance=1.48 at 40 ppm.

Example 7

Preparation of Krytox® Substituted cis-Naphthalimide Dye (VK1)

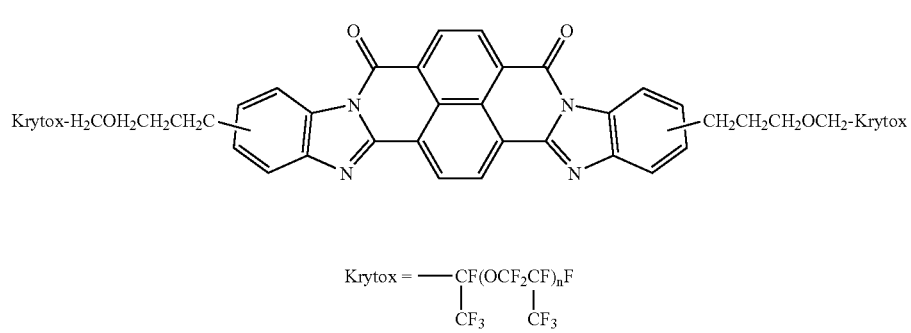

VK1

1. Synthesis of Dibromo substituted cis-Naphthalimide Dye

A mixture of bisbenzimidazo[2,1-b:1',2'-j]benzo[lmn][3,8]phenanthroline-6,9-dione (C.I. Pigment Red 194, 1.00 gm, 2.42 mmol, Aakash Chemicals & Dye-stuffs, inc.) and N-bromosuccinimide (2.60 gm, 14.6 mmol, Aldrich) was stirred in a solution of trifluoroacetic acid (50 mL, Aldrich) and $H_2SO_4$ (15 mL, Fisher Scientific) at room temperature for 24 hours. The resulting dark purple solution was poured into 200 mL of ice water. The solid obtained was washed with water and removed by filtration and dried (60° C., 60 Torr) overnight. A dark purple solid (1.45 gm, 82%) was obtained.

2. Synthesis of VK1

A solution of 25 mL (11.25 mmole, Callery Chemical) of 9-borabicyclo[3.3.1]nonane in 0.45-0.50 M of tetrahydrofuran was added dropwise to a stirring solution of 4 gm (2.50 mmole) Krytox ally ether (MW=1600, Dupont) and 10 mL of ethyl perfluorobutyl ether (3M) at 0° C. The resulting suspension was stirred at room temperature for 24 hours, during which time the mixture became homogeneous. 15 ML of 3M of aqueous NaOH was added to the mixture and the mixture was stirred for 30 minutes. The solution was transferred into a mixture of 0.44 gm (0.60 mmole) dibromo substituted cis-naphthalimide dye and 0.23 gm (0.19 mmole, Aldrich) [1,1'-bis(diphenylphosphino)ferrocene]dichloropalladium(II), complex with dichloromethane, $PdCl_2(dppf)_2\text{—}CH_2Cl_2$, under Ar and refluxed for 24 hours. The resulting mixture was extracted with 20 mL perfluoropolyether PFS-2 (Ausimont) and washed with water (2×10 mL) and acetone (5×10 mL). The organic layer was separated, dried with $Na_2SO_4$ and concentrated. The residue was purified by Soxhlet extraction with ether and PFS-2 to yield 1.15 gm (52%) of a dark orange oil. The UV-Vis spectra of the VK1 dye (40 ppm) in HT-200 was $\lambda_{max}$=478 nm, O.D.=0.23 (40 ppm in HT200).

A Krytox® substituted trans-naphthalimide dye (VK2) of the following structure was similarly prepared, except that the starting material, bisbenzimidazo-[2,1-b: 1',2'-j]benzo[1 nm][3,8]phenanthroline-6,9-dione, used for the preparation of VK1 was replaced with bisbenzimidazo[2,1-b: 1',2'-j]benzo[Imn][3,8]phenanthroline-8,17-dione.

The VK2 dye obtained was also a dark orange oil. The UV-Vis spectra of the VK2 dye (40 ppm) in HT-200 was $\lambda_{max}$=474 nm, O.D.=0.34 (40 ppm in HT200).

Example 8

A: Primer Coated Transparent Conductor Film

A primer coating solution containing 33.2 gm of EB 600™ (acrylated epoxy oligomer, UCB, Smyrna, Ga.), 16.12 gm of SR 399™ (pentafunctional monomer, Sartomer, Exton, Pa.), 16.12 gm of TMPTA (trimethylolpropane triacrylate, UCB, Smyrna, Ga.), 20.61 gm of HDDA (UCB, Smyrna, Ga.), 2 gm of Irgacure™ 369 (2-benzyl-2-(dimethylamino)-1-[4-(4-morpholinyl)phenyl]-1-butanone, Ciba, Tarrytown, N.Y.), 0.1 gm of Irganox™ 1035 (thiodiethylene bis(3,5-di(tert)-butyl-4-hydroxyhydrocinnamate, Ciba), 44.35 gm of poly(ethyl methacrylate) (MW. 515,000, Aldrich, Milwaukee, Wis.) and 399.15 gm of MEK (methyl ethyl ketone) was mixed thoroughly and coated onto a 5 mil transparent conductor film (ITO/PET film, 5 mil OC50 from CPFilms, Martinsville, Va.) using a #4 drawdown bar. The coated ITO film was dried in an oven at 65° C. for 10 minutes, then exposed to 1.8 J/cm$^2$ of UV light under nitrogen using a UV conveyer (DDU, Los Angles, Calif.).

B: Preparation of Microcups

TABLE 1

| Microcup Composition | | |
|---|---|---|
| Component | Weight Part | Source |
| EB 600 | 33.15 | UCB |
| SR 399 | 32.24 | Sartomer |
| HDDA | 20.61 | UCB |
| EB1360 | 6.00 | UCB |
| Hycar X43 | 8.00 | BF Goodrich |
| Irgacure 369 | 0.20 | Ciba |
| ITX | 0.04 | Aldrich |
| Antioxidant Ir1035 | 0.10 | Ciba |

33.15 Gm of EB 600™ (UCB, Smyrna, Ga.), 32.24 gm of SR399™ (Sartomer, Exton, Pa.), 6 gm of EB1360™ (silicone acrylate, UCB, Smyrna, Ga.), 8 gm of Hycar 1300×43 (reactive liquid polymer, Noveon Inc. Cleveland, Ohio), 0.2 gm of Irgacure™ 369 (Ciba, Tarrytown, N.Y.), 0.04 gm of ITX (Isopropyl-9H-thioxanthen-9-one, Aldrich, Milwaukee, Wis.), 0.1 gm of Irganox™ 1035 (Ciba, Tarrytown, N.Y.) and 20.61 gm of HDDA (1,6-hexanediol diacrylate, UCB, Smyrna, Ga.) were mixed thoroughly with a Stir-Pak mixer (Cole Parmer, Vernon, Ill.) at room temperature for about 1 hour and debubbled by a centrifuge at 2000 rpm for about 15 minutes.

The microcup composition was slowly coated onto a 4"×4" electroformed Ni male mold for an array of 72 μm (length)× 72 μm (width)×35 μm (depth)×13 μm (width of top surface of the partition wall between microcups. A plastic blade was used to remove excess of fluid and gently squeezed into "valleys" of the Ni mold. The coated Ni mold was heated in an oven at 65° C. for 5 minutes and laminated with the primer coated ITO/PET film prepared in Section A above, with the primer layer facing the Ni mold using a GBC Eagle 35 laminator (GBC, Northbrook, Ill.) preset at a roller temperature of 100° C., lamination speed of 1 ft/min and the roll gap at "heavy gauge". A UV curing station with a UV intensity of 2.5 mJ/cm$^2$ was used to cure the panel for 5 seconds. The ITO/PET film was then peeled away from the Ni mold at a peeling angle of about 30 degree to give a 4"×4" microcup array on ITO/PET. An acceptable release of the microcup array from the mold was observed. The thus obtained microcup array was further post-cured with a UV conveyor curing system (DDU, Los Angles, Calif.) with a UV dosage of 1.7 J/cm$^2$.

C: Filling and Sealing with a Sealing Composition

1 Gm of an electrophoretic dispersion containing 6% by weight (dry weight) of the TiO$_2$ particles and a dye or colorant prepared from the examples above in an amount as indicated, in HT-200 (Solvay Solexis) was filled into the 4"×4" microcup array prepared from Section B above using a #0 drawdown bar. The excess of fluid was scraped away by a rubber blade. The filled microcups were then overcoated with a 10% rubber solution consisting of 9 parts of Kraton G1650 (styrene-ethylene/butylenes-styrene block copolymer, Shell, Tex.), 1 part of GRP 6919 (hydrogenated styrene block copolymer, Shell), 3 parts of Cab-O-Sil TS-720 (treated fumed silica, Cabot Corp., IL), 78.3 parts of Isopar E (hydrocarbon fluid, Exxon Mobil) and 8.7 parts of isopropyl acetate, by a Universal Blade Applicator and dried at room temperature to form a seamless sealing layer of about 2-3 μm dry thickness with good uniformity.

Sample 8.1 had 2.15% by weight of P6B dye (from Example 3.1) and 0.55% by weight of R30 dye (from Example 3.3). Sample 8.2 had 0.98% by weight of a CuPc-C$_8$H$_{17}$ dye prepared according to U.S. Pat. No. 3,281,426 and 2.02% by weight of PK1 dye (from Example 6.1). Sample 8.3 had 2.1% by weight of C3 dye (from Example 1.1). Sample 8.4 had 1.23% by weight of a CuPc-C$_8$F$_{17}$ dye prepared according to U.S. Pat. No. 3,281,426, 2.88% by weight of R30 (from Example 3.3) and 0.04% by weight of PK1 dye (from Example 6.1).

D: Lamination

The ITO side of an ITO/PET conductor film (5 mil OC50 from CPFilms) was overcoated with a 25% by weight solution of a pressure sensitive adhesive (Durotak 1105, National Starch, Bridgewater, N.J.) in methyl ethyl ketone (MEK) by a drawdown bar (targeted coverage: 0.6 gm/ft$^2$). The adhesive coated ITO/PET layer was then laminated over the sealed microcups prepared from Section C above with a GBC Eagle 35 laminator at 70° C. The lamination speed was set at 1 ft/min with a gap of 1/32".

The performance of the dyes or colorants of the present invention is summarized in Table 1 below.

TABLE 1

| EPD Fluids | Dye(s) | | | Dmax @40 V | Contrast Ratio @40 V | Ton @40 V (msec) | Toff @40 V (msec) |
|---|---|---|---|---|---|---|---|
| 8.1 (Red) | P6B 2.15 wt % | R30 0.55 wt % | — | 1.24 | 2.8 | 538 | 838 |
| 8.2 (Green) | CuPc-C$_8$F$_{17}$ 0.98 wt % | PK1 2.02 wt % | — | 1.29 | 3.4 | 738 | 288 |
| 8.3 (Blue) | C3 2.1 wt % | — | — | 1.78 | 9.8 | 400 | 887 |
| 8.4 | CuPc- | R30 | PK1 | 1.68 | 7.8 | 200 | 250 |

TABLE 1-continued

| EPD Fluids | Dye(s) | Dmax @40 V | Contrast Ratio @40 V | Ton @40 V (msec) | Toff @40 V (msec) |
|---|---|---|---|---|---|
| (Black) | $C_8F_{17}$ 1.23 wt % | 2.88 wt % | 0.04 wt % | | |

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

It is therefore wished that this invention to be defined by the scope of the appended claims as broadly as the prior art will permit, and in view of the specification.

What is claimed is:

1. An electrophoretic dispersion comprising charged pigment particles dispersed in a fluorinated solvent, wherein said fluorinated solvent comprises a fluorinated perylene dye or colorant expressed by the following Formula (IV):

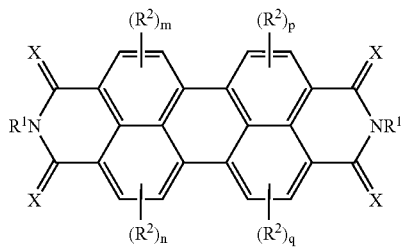

(IV)

wherein:
m, n, p and q are independently 0-2;
X is O, S or NR wherein R is hydrogen, alkyl, heteroalkyl, aryl, heteroaryl or a halogenated derivative of alkyl, heteroalkyl, aryl, heteroaryl or $R_f$-A- in which $R_f$ and A are defined below;
$R^1$s are independently hydrogen, alkyl, heteroalkyl, aryl, heteroaryl or a halogenated derivative of alkyl, heteroalkyl, aryl or heteroaryl; or $R^1$ is $R_f$-A- wherein $R_f$ and A are defined below;
$R^2$s are independently hydrogen, halogen, alkyl, heteroalkyl, aryl, heteroaryl or a halogenated derivative of alkyl, heteroalkyl, aryl or heteroaryl, R'O—, R'S—, R'R"N—, R'C(O)—, R'OC(O)—, R'C(O)—, R'C(O)NR"—, R'R"NC(O)—, R'NHC(O)NR"—, $R'SO_2NR"$— or $R'R"NSO_2$— in which R' and R" are independently hydrogen, alkyl, heteroalkyl, aryl, heteroaryl or a halogenated derivative of alkyl, heteroalkyl, aryl or heteraryl; or
$R^2$s are independently $R_f$-A- wherein $R_f$ and A are defined below;

$R_f$ is a fluorinated alkyl, fluorinated heteroalkyl, fluorinated aryl or fluorinated heteroaryl or a low/medium molecular weight fluorinated polymeric or oligomeric moiety; and A is absent or a linking chain comprising one or more of the following, connected together: —O—, —S—, —SO—, $—SO_2—$, $—SO_2NR'—$, —NR'—, —NR'CO—, —NR'COO—, —NR'CONR"—, —NR'CS—, —NR'CSO—, —NR'CSNR"—, —OC(O)—, $—OC_2—$, —C(O)O—, —OC(O)N'R—, alkylene, arylene, and a halogenated derivative of alkylene or arylene, wherein R' and R" are as defined above, wherein the fluorinated perylene dye or colorant comprises at least about 25% by weight of fluorine.

2. The electrophoretic dispersion of claim 1 wherein $R_f$ is represented by the following Formula (A):

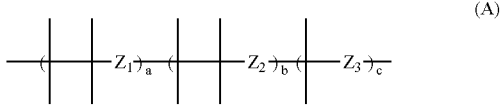

(A)

wherein the open and undesignated substituent positions on the main chain of Formula (A) are the same or different and are independently selected from the group consisting of hydrogen, halogen, alkyl, heteroalkyl, aryl, heteroaryl or a halogenated derivative of alkyl, heteroalkyl, aryl or heteroaryl, $—OR^a$, $—OC(O)R^a$, $—C(O)OR^a$, $—C(O)NR^aR^b$ wherein $R^a$ and $R^b$ are independently hydrogen, alkyl, heteroalkyl, aryl, heteroaryl or a halogenated derivative of alkyl, heteroalkyl, aryl or heteraryl;

$Z_1$, $Z_2$, and $Z_3$ are independently oxygen or absent;

a, b and c are the weight fractions of the corresponding repeating units and are independently in the range of 0-1 with their sum no greater than 1.

3. The electrophoretic dispersion of claim 1 wherein X is O.

4. The electrophoretic dispersion of claim 2 wherein at least one of the $R^1$s is $R_f$-A- in which $R_f$ is a fluorinated alkyl or a fluoropolyether of Formula (A) and A is absent, an alkylene or a linking chain comprising an alkylene and —NR'C(O)— in which R' is hydrogen or an alkyl.

5. The electrophoretic dispersion of claim 2 wherein m, n, p and q are all 0.

6. The electrophoretic dispersion of claim 2 wherein $R^2$ is chlorine and m, n, p and q are all 1.

7. The electrophoretic dispersion of claim 1 wherein at least one of $R^2$s is $R_f$-A- wherein $R_f$ is a fluorinated alkyl or a fluoropolyether of Formula (A) and A is independently a linking moiety comprising —S— and alkylene or a linking moiety comprising —O— and alkylene.

8. The electrophoretic dispersion of claim 1 wherein the fluorinated perylene dye or colorant comprises at least about 35% by weight of fluorine.

9. The electrophoretic dispersion of claim 1 wherein the fluorinated perylene dye or colorant comprises at least about 50% by weight of fluorine.

10. The electrophoretic dispersion of claim 5 wherein $R^1$ is $R_f$-A-, $R_f$ is a fluoropolyether of Formula (A) and A is —NR'C(O)-alkyelne in which R' is an alkyl.

11. The electrophoretic dispersion of claim 10 wherein R' is methyl.

12. The electrophoretic dispersion of claim 6 wherein $R^1$ is $R_f$-A- in which $R_f$ is a fluoroether of Formula (A) and A is —NR'C(O)-alkyene in which R' is an alkyl.

13. The electrophoretic dispersion of claim 12 wherein R' is methyl.

14. The electrophoretic dispersion of claim 7 wherein m, n, p and q are 1, $R^1$ is $R_f$A- in which $R_f$ is a fluoroalkyl and A is —$CH_2$—, $R^2$ is $R_f$-A- in which $R_f$ is a fluoroalkyl and A is —S-alkylene- or —O-alkylene-.

15. The electrophoretic dispersion of claim 1, wherein the fluorinated perylene dye or colorant is

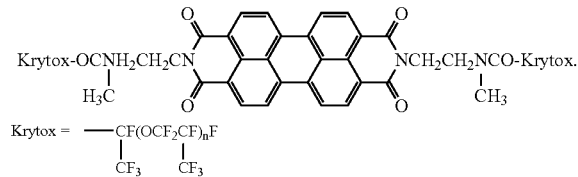

16. The electrophoretic dispersion of claim 1, wherein the fluorinated perylene dye or colorant is

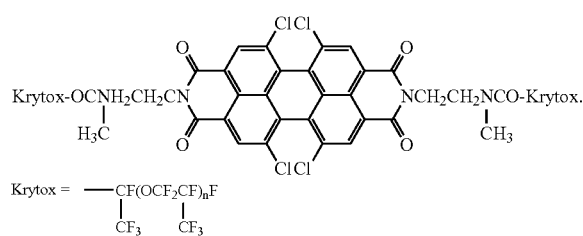

17. The electrophoretic dispersion of claim 1, wherein the fluorinated perylene dye or colorant is

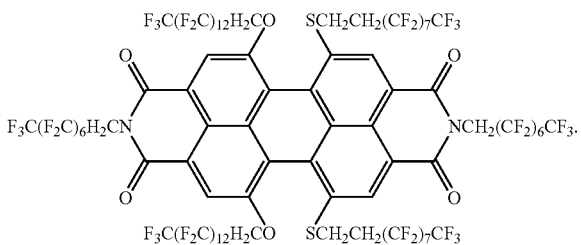

18. The electrophoretic dispersion of claim 1 wherein said fluorinated solvent is selected from the group consisting of perfluoroarylalkanes, perfluoro-tert-amines, perfluoropolyethers and hydrofluoropolyethers.

19. The electrophoretic dispersion of claim 18 wherein said fluorinated solvent is a perfluoropolyether or hydrofluoropolyether.

20. A fluorinated perylene compound of

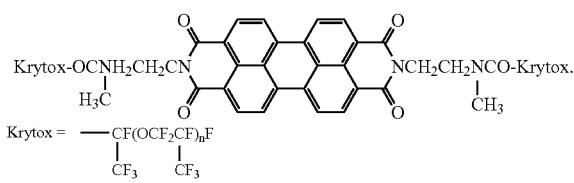

21. A fluorinated perylene compound of

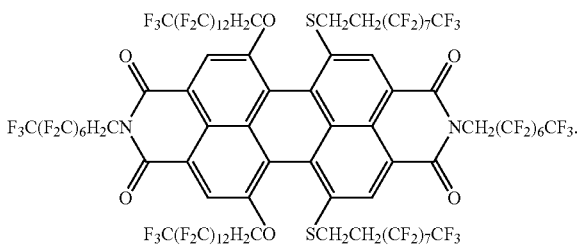

22. A fluorinated perylene compound of

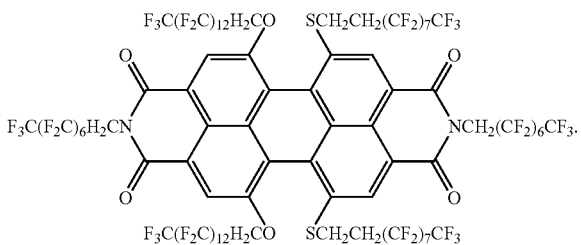

* * * * *